US005720254A

United States Patent [19]
Yoshida et al.

[11] Patent Number: 5,720,254
[45] Date of Patent: Feb. 24, 1998

[54] FUEL INJECTION SYSTEM FOR ENGINE

[75] Inventors: Takeo Yoshida; Takahiro Suzuki, both of Iwata, Japan

[73] Assignee: Yamaha Hatsudoki Kabushiki Kaisha, Iwata, Japan

[21] Appl. No.: 650,430

[22] Filed: May 20, 1996

[30] Foreign Application Priority Data

| May 31, 1995 | [JP] | Japan | 7-157160 |
| May 19, 1995 | [JP] | Japan | 7-145318 |

[51] Int. Cl.$^6$ ............................................. F02M 51/00
[52] U.S. Cl. ............................................. 123/305
[58] Field of Search ........................ 123/305, 73 PP, 123/478, 73 C

[56] References Cited

U.S. PATENT DOCUMENTS

| 4,753,213 | 6/1988 | Schlunke et al. | 123/533 |
| 4,790,270 | 12/1988 | McKay et al. | 123/73 C |
| 4,932,371 | 6/1990 | Alberson et al. | 123/73 SP |
| 5,211,145 | 5/1993 | Ichikawa et al. | 123/295 |
| 5,284,111 | 2/1994 | Geyer et al. | 123/73 C |

*Primary Examiner*—Willis R. Wolfe
*Assistant Examiner*—Hieu T. Vo
*Attorney, Agent, or Firm*—Knobbe, Martens, Olson & Bear LLP

[57] ABSTRACT

A number of embodiments of engines having direct cylinder injection wherein the fuel injector is positioned so as to be shrouded by the piston during at least a portion of its stroke. This permits the use of less expensive and lower pressure fuel injection nozzles. The spray pattern of the injector is chosen so that some fuel is sprayed toward the spark plug to provide stratification, but the major portion is directed toward the head of the piston so to as insure a homogeneous mixture when operating at high speed, high load conditions. In addition the spray is controlled so that none of the fuel passes out of the exhaust port.

26 Claims, 20 Drawing Sheets

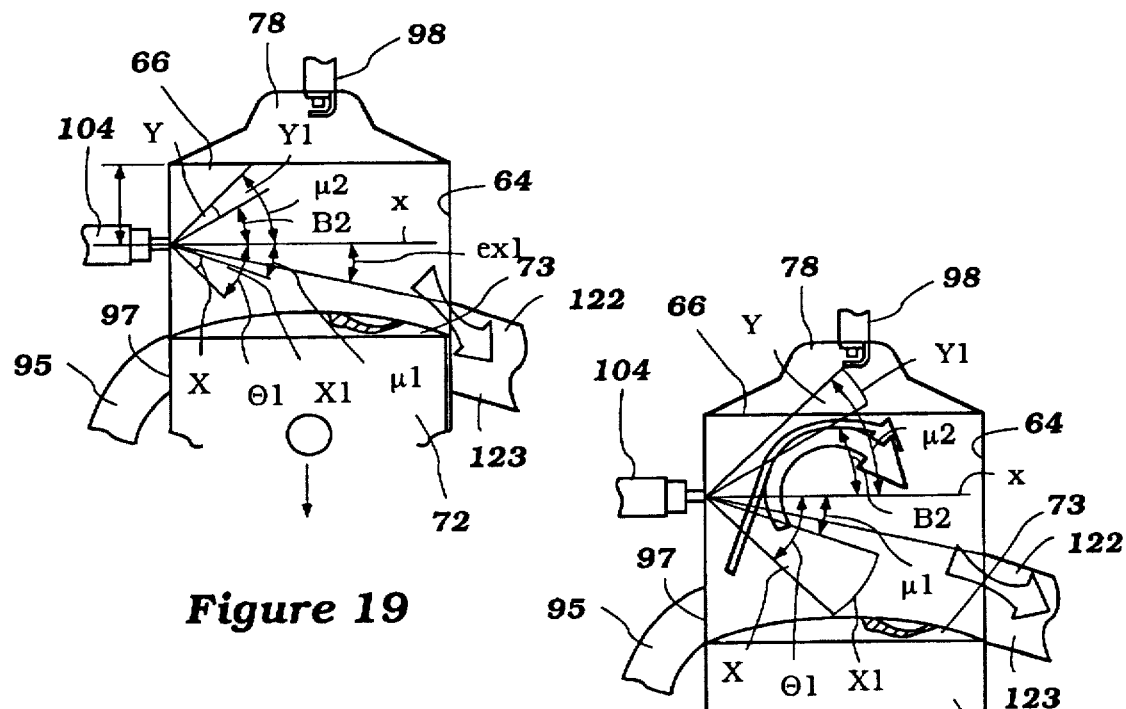
Figure 19
Figure 20
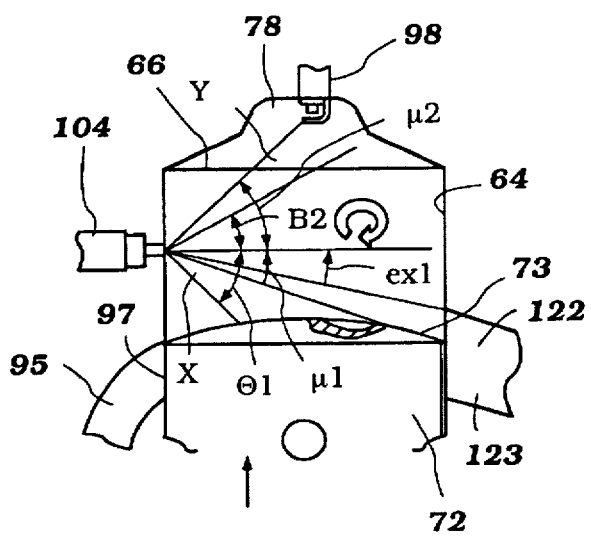
Figure 21
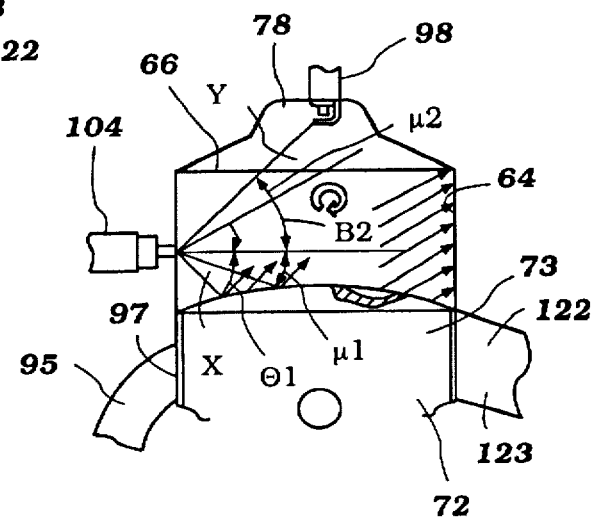
Figure 22

FUEL INJECTION SYSTEM FOR ENGINE

BACKGROUND OF THE INVENTION

This invention relates to a fuel injection system and method for an engine and more particularly to an improved direct cylinder injection arrangement and operational method for such engines.

In the interest of improving engine performance and particularly fuel economy and exhaust emission control, the utilization of fuel injection offers a number of advantages. It has been generally the practice to employ manifold-type fuel injection systems because of their simplicity and the fact that they permit the use of lower cost fuel injectors.

Although direct cylinder injection has a number of advantages over manifold injection, the hostile environment in the combustion chamber at the time of combustion necessitates very high cost fuel injection systems and particularly the fuel injector which itself is exposed in the combustion chamber.

A type of direct fuel injection system has been proposed, however, where the fuel injector is mounted in the cylinder block and projects so that its spray axis extends through one of the cylinder bores rather than the more conventional mounting in the cylinder head. By mounting the fuel injector so that it is shrouded at times by the piston, it is possible to utilize lower cost fuel injectors than those which are mounted in the cylinder head. Because the piston shrouds the fuel injector during at least a portion of the combustion cycle, the fuel injector need not be capable of withstanding the same combustion conditions as cylinder head mounted fuel injectors.

There are, however, a number of difficulties that are presented by such cylinder block mounting of the fuel injector. First of these has to do with the amount of fuel which can be injected into the combustion chamber. Since the fuel injector is shrouded by the piston during at least a portion of the stroke, the amount of time available for fuel injection is substantially less than if the injector were mounted in the cylinder head. This may decrease the maximum output which can be obtained from the engine.

Although the amount of fuel injected can be increased by either increasing the pressure of injection or by increasing the number of injection nozzles, both expedients tend to offset the advantages of this type of injector mounting. That is, if the injection pressure becomes higher, then the cost of the injector goes up. Also, multiple injectors are obviously more expensive than single injectors.

It is, therefore, a principle object of this invention to provide an improved arrangement and injection method for an in-cylinder fuel injected engine wherein the injector is protected from the combustion process adequately but wherein the injector is exposed to the combustion chamber for a long enough time period that adequate fuel can be injected under all running conditions without resorting to high-pressure fuel injectors.

It is a still further object of this invention to provide an improved direct cylinder injected engine having a fuel injector mounted in the cylinder bore.

Another problem attendant with the in-cylinder injector mounting is that the spray axis extends generally transversely to the cylinder bore axis. When the fuel injector is mounted in the cylinder head, its spray axis can be directed more along the cylinder bore axis and it is easier to achieve a homogeneous mixture in the combustion chamber, as is required when operating at high-speed and high-load conditions. However, this problem becomes more severe when the injector sprays transversely to the cylinder bore axis as is generally required by cylinder block injection mounting locations.

This is also another reason why a high pressure of injection is not desirable with this type of mounting. If the injection pressure is too high, the fuel may be deposited on the opposing cylinder bore wall and be shrouded by the piston so as to preclude combustion of the deposited fuel. Also, if the engine is a two-cycle ported engine, then there becomes a risk that some of the fuel will be sprayed out of the exhaust port.

It is, therefore, a still further object of this invention to provide an improved fuel injector arrangement for an in-cylinder, cylinder block mounted fuel injector.

It is another object of this invention to provide an in-cylinder mounted fuel injector that sprays transversely to the cylinder bore axis but which can provide the necessary spray pattern and injection amount to ensure an adequate and homogeneous mixture in the combustion chamber when required.

The mounting of the fuel injector in the cylinder wall of the engine presents a particular problem in conjunction with two-cycle engines. Because of the scavenging system and exhaust port arrangement, the injector should be mounted an operated in a way such that fuel sprayed by the injector does not pass out of the exhaust port when it is opened, as already noted. This problem is particularly acute in conjunction with high speed, high load running when long fuel durations are required. The problem may also exist, however, under low speed, low load running.

It is, therefore, a still further object of this invention to provide an improved fuel injection arrangement for a direct injected two-cycle engine wherein the fuel injection is such that the fuel will not pass out of the exhaust port.

SUMMARY OF THE INVENTION

First features of this invention are adapted to be embodied in a direct cylinder injected, two cycle internal combustion engine that is comprised of a cylinder block having a cylinder bore extending from an upper peripheral edge closed by a cylinder head. A piston reciprocates in the cylinder bore between a bottom dead center (BDC) position and a top dead center (TDC) position and forms with the cylinder bore and the cylinder head a variable volume chamber. A fuel injector is supported within the cylinder block and has a nozzle spray axis that extends into the cylinder bore and which sprays transversely therein relative to the cylinder bore axis. An exhaust port is formed in the cylinder bore and is opened and closed by the reciprocation of the piston. In accordance with a method for operating the engine and in accordance with a structure of the engine, the fuel injector is operated so that it will spray adequate fuel for engine operation under all running conditions, but the fuel spray will not pass out of the exhaust port during the engine operation.

One way in which this result is accomplished is by limiting the penetration of the spray from the fuel injector into the cylinder. This is done by controlling the speed at which the fuel exits the injector and also the pressure at which fuel is delivered to the body of the injector.

Another way in which this result is obtained by controlling the timing of injection of fuel from the injectors so that the injection always terminates at an adequate time before it can reach the exhaust port when the exhaust port is opened.

BRIEF DESCRIPTION OF THE DRAWINGS

FIGS. 19, 20, 21 and 22 are cross-sectional views, in part similar to FIGS. 13-16 and show the relationship of the spray pattern relative to the piston during the stroke in accordance with the embodiment of FIG. 18.

DETAILED DESCRIPTION OF THE PREFERRED EMBODIMENTS OF THE INVENTION

Figure 1:
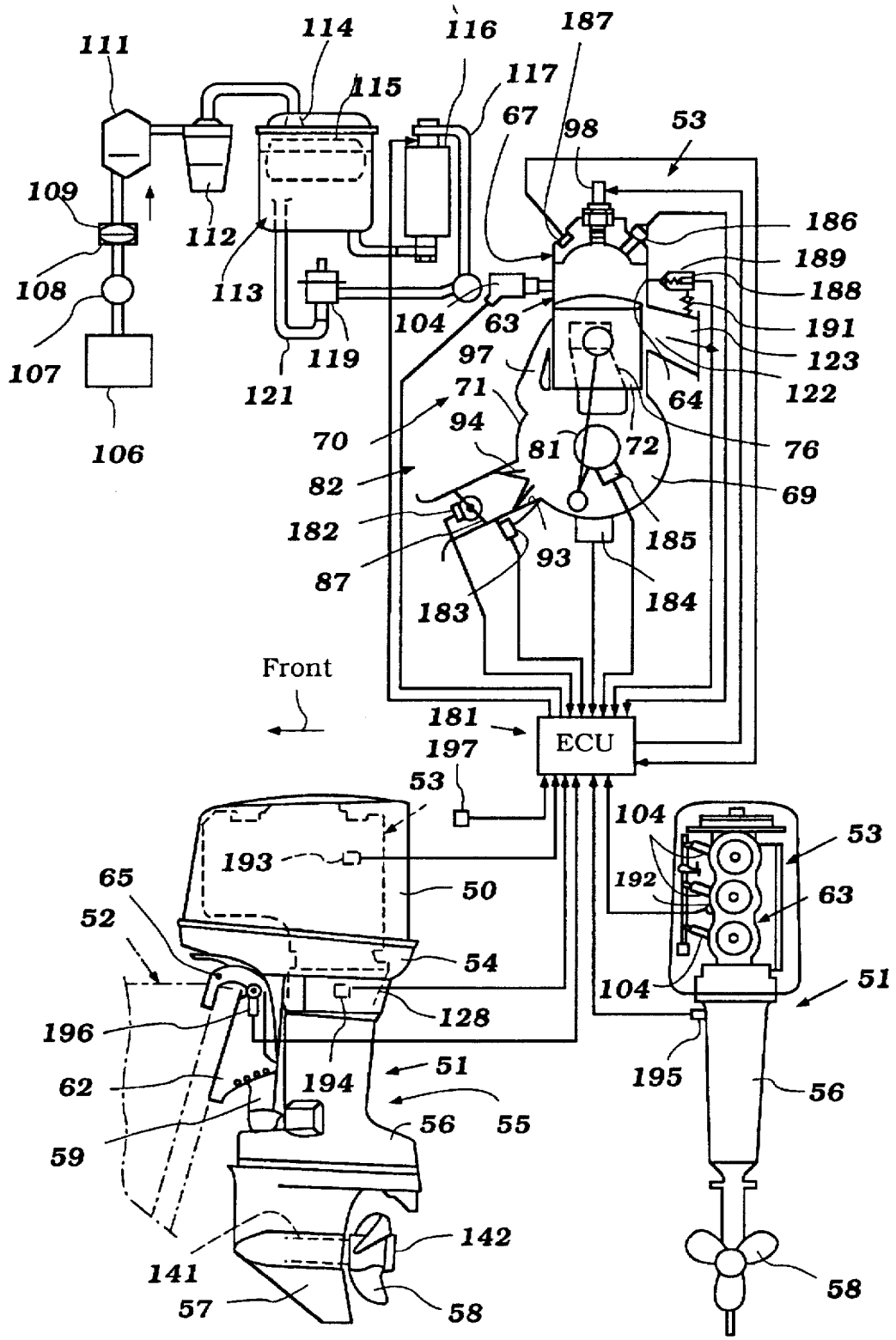
FIG. 1 is a multi-part view showing, in the lower left-hand corner thereof, an outboard motor constructed and operated in accordance with an embodiment of the invention as attached to the transom of an associated watercraft which is shown partially and in phantom; at the lower right hand side, a rear elevational view of the outboard motor with a portion of the protective cowling removed; and in the upper view, a top cross-sectional view taken through the engine and showing the engine in part schematically along with the components of the fuel injection and control system for the engine.

Referring now to the first embodiment, which is shown in FIGS. 1-17, this embodiment will be described first by reference particularly to FIGS. 1 and 2. This embodiment is adapted to be utilized in conjunction with an outboard motor, which is indicated generally by the reference numeral 51 and which is shown as attached to the transom of a watercraft, which watercraft is indicated generally by the reference numeral 52 but which is shown in phantom. The invention is described in conjunction with an outboard motor because certain facets of it have particular application to two-cycle crankcase compression internal combustion engines. Such engines are frequently employed as the power plants for outboard motors, but as will be apparent by reference to another embodiment, the invention may be utilized in conjunction with applications for two-cycle engines other than outboard motors.

Also and as will also become apparent, the invention is not limited to its applicability to two-cycle engines. Although the invention has particular utility with two-cycle engines because of the emission control problems particularly peculiar to these engines due to the scavenging cycle, the invention also may be utilized with four-cycle engines.

Although the invention deals primarily with the engine and its control system, the total environment will be described by continuing reference to FIGS. 1 and 2. The outboard motor 51 includes a power head that includes a powering internal combustion engine 53. In the illustrated embodiment and as has been noted, the engine 53 is a two-cycle, crankcase compression engine. Also, in the illustrated embodiment the engine 53 is of the three cylinder, in-line type. For the reasons already noted, it will be apparent to those skilled in the art how the invention can be utilized with other types of engines and engines having other configurations.

In addition to the engine 53, the power head includes a protective cowling that is comprised of a lower tray portion 54 to which a detachable main cover portion 50 is connected in a known manner. This power head is formed at the upper end of a drive shaft housing 55. The drive shaft housing 55 includes an outer casing 56 which includes certain components, some of which will be described. In addition, a drive shaft which is driven by the engine output shaft is journaled in the drive shaft housing 55 and depends into a lower unit 57. A propeller 58 is fixed on a propeller shaft driven by a transmission in the lower unit 57 for powering the associated watercraft 52.

A steering shaft (not shown) is affixed to the outer casing 56 of the drive shaft housing 55. This steering shaft is journaled in a swivel bracket 59 for steering of the outboard motor 51 about a generally vertically extending steering axis in a manner well known in this art. In addition, the swivel bracket 59 is pivotally connected by a trim pin 61 to a clamping bracket 62. This pivotal connection permits tilt and trim movement of the outboard motor 51 in a manner well known in this art. As has been noted, the construction of the outboard motor 51 has been described primarily to permit those skilled in the art to understand an environment in which the invention may be utilized. Since the invention deals with the engine 53, and primarily with its fuel injection system, and injector, injector location and control methodology, further description of the outboard motor, except for components which are associated more directly with the engine 53, will not be made. Those skilled in the art can refer to any known constructions for features of outboard motors with which the invention can be practiced.

The engine 53 will now be described in more detail by continuing reference to FIG. 1, and to FIGS. 3–5 and 7. The engine 53 includes a cylinder block assembly, indicated generally by the reference numeral 63, in which three aligned vertically spaced cylinder bores 64 are formed by pressed or cast-in cylinder liners 65. It should be readily apparent, however, that the invention may be practiced with engines wherein the cylinder bores are formed directly in the material of the cylinder block 63, or by plated liners formed therein.

The cylinder bores 64 extend upwardly and terminates at an upper surface 66 of the cylinder block 63. Actually, the engine is oriented so that the cylinder block surface 66 is at one end of the engine.

A cylinder head assembly, indicated generally by the reference numeral 67, is affixed to the cylinder block 63 in any known manner. The cylinder head assembly is in sealing relation with the block surface 66. The cylinder head 67 is provided with individual recesses 68 which form a portion of the combustion chambers of the engine for each cylinder, as will become apparent.

The end of the cylinder bores 64 opposite to the cylinder head 67 forms a crankcase chamber 69. This crankcase chamber 69 is formed by a skirt of the cylinder block 63 and a crankcase member 71 that is detachably affixed thereto in a known manner. In accordance with typical two-cycle engine practice, the crankcase chamber 69 associated with each of the cylinder bores 64 are sealed relative to each other so as to permit the induction of a charge thereto.

Pistons 72 are slidably supported in each of the cylinder bores 64. The pistons 72 have head portions 73 that are formed with upper and lower piston ring grooves 74 and 75 in which respective piston rings 76 and 77 are received. As is well known in this art, the piston rings 76 and 77 form a sealing function between the pistons 72 and the cylinder bore 64 so as to complete the formation of the combustion chamber. Since at top dead center position, the combustion chamber is formed primarily by the cylinder head recess 68, at times this reference numeral will also be used to refer to the combustion chamber of the engine.

The pistons 72 are each connected by means of a piston pin 78 to the small end of a connecting rod 79. Each connecting rod 79 is journaled on a respective throw of a crankshaft 81. As is typical with two-cycle engine practice, the crankshaft 81 rotates about a vertically extending axis so as to facilitate its connection to the drive shaft afore-referred to.

In view of the fact that the engine 53 in the illustrated embodiment is of the three cylinder type, in order to provide equal firing intervals, the throws of the crankshaft 81 associated with each of the connecting rods 79 are offset from each other by 120°. Of course, other arrangements also may be employed.

An induction system, indicated generally by the reference numeral 82, is provided for delivering an air charge to the crankcase chamber 69 as the pistons 72 move upwardly during their stroke. As will be seen in FIG. 3, where the piston 72 is shown approximately midway in its stroke, the piston moves from a bottom dead center position, wherein the head 73 is spaced a distance L from the upper end of the cylinder bore 64 in the cylinder head surface 68. At its top dead center position, as will be described later, the piston is disposed so that the head 73 substantially coincides with the surface 66. The position of the piston rings 76 and 77 in this top dead center (TDC) position are shown in phantom lines in this figure. In this position, the lowermost portion of the uppermost piston groove 74 is disposed at a distance RS below the cylinder block upper surface 66.

Figure 7:
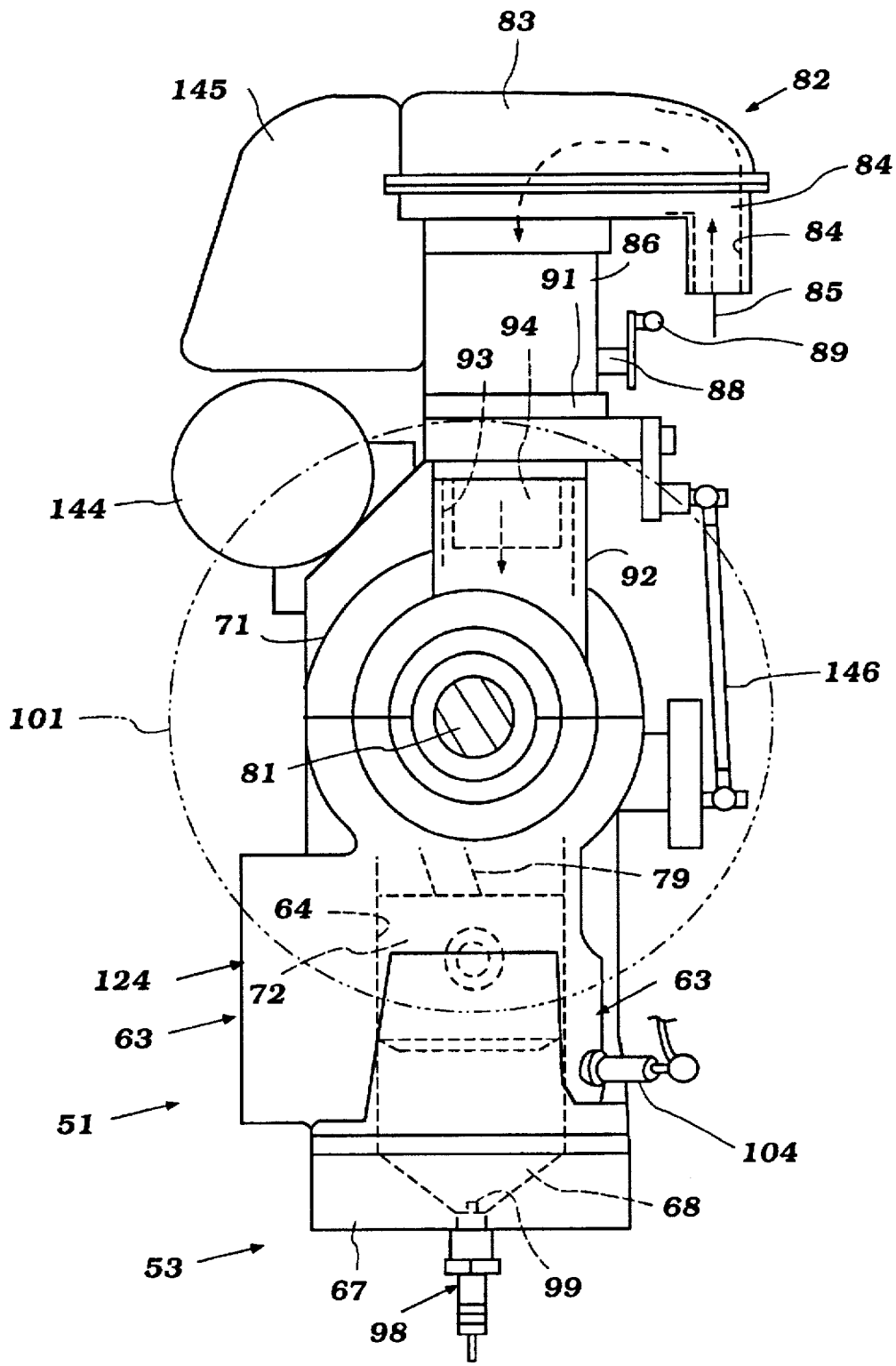
FIG. 7 is a top plan view of the engine of the outboard motor with the protective cowling removed and other portions shown in phantom.

The induction system 82 may be seen best in FIGS. 1 and 7, and it includes a silencing air inlet device 83 having one or more atmospheric air inlet openings 84 that receive air flowing in the direction indicated by the arrow 85. This air flow is admitted into the protective cowling by one or more air inlet openings formed in the main cowling member 50, as is well known in this art and which are illustrated schematically in FIG. 2.

The inducted air passes into throttle bodies, indicated generally by the reference numeral 86, in which a butterfly-type throttle valves, indicated generally by the reference numeral 87 and shown in FIG. 1, are positioned. Each crankcase chamber 69 is provided with a respective throttle body 86 and throttle valve 87. These throttle valves all are positioned on respective throttle valve shafts 88 that have link arms 89 at the end thereof for connection to an appropriate linkage system for controlling the speed of the engine, as is well known in this art.

The throttle bodies 86 have flange portions 91 that are connected to intake manifolds 92 which communicate with intake ports 93 formed in the crankcase member 71 for delivery of the air charge to the crankcase chamber 69. A reed-type check valve 94 is provided in each of the intake ports 93 so as to permit the air charge to be inducted into the crankcase chambers 69 when the pistons 72 are on their up or intake stroke. However, when the pistons 72 move downwardly to compress the charge in the crankcase chamber 69, the reed-type check valves 94 will close and preclude reverse flow.

The charge which has been compressed in the crankcase chambers is then transferred to the combustion chambers 68 through a scavenging system, indicated generally by the reference numeral 70. This scavenging system 70 includes a center scavenging passage 95 (see FIG. 5) and a pair of side scavenging passages 96, which are disposed on opposite sides thereof. These scavenge passages 95 and 96 communicate with the combustion chamber 68 during a portion of the stroke of the piston through respective scavenge ports 97. The scavenging system provides a Schnurl type of scavenging flow, as will be described.

A spark plug 98 is mounted in the cylinder head 67 for each combustion chamber recess 68. The spark plugs 98 have their spark gaps 99 disposed substantially at the center of the recesses 68.

A flywheel magneto assembly, indicated generally by the reference numeral 101, is connected to the upper end of the crankshaft 81 by means of a key and nut 102 so as to generate electrical power for firing of the spark plugs 98 and providing other electrical power for the engine.

A fuel supply charge forming system is provided for supplying fuel to the combustion chamber recesses 68 for firing by the spark plugs 98. This fuel supply system will be described by primary reference to FIGS. 1 and 2, with this latter figure showing also certain components of the air induction system already described in a schematic fashion. Reference has been made to the atmospheric air inlet in the protective cowling, and this is shown schematically in FIG. 2, and is identified generally by the reference numeral 103.

The fuel supply or charge forming system includes fuel injectors, indicated generally by the reference numeral 104, and which have a preferred construction in accordance with any one of the embodiments which will be later described. Each fuel injector 104 is mounted so that its spray port aligns with an opening 105 in the cylinder bore 64, and specifically the liner 65, so that the injector axis "x" lies on a line that is generally perpendicular to the axis of the cylinder bore 64 and which is spaced at a distance A below the upper cylinder head surface 66. The spray relationship will be described later.

Figures 4, 5:
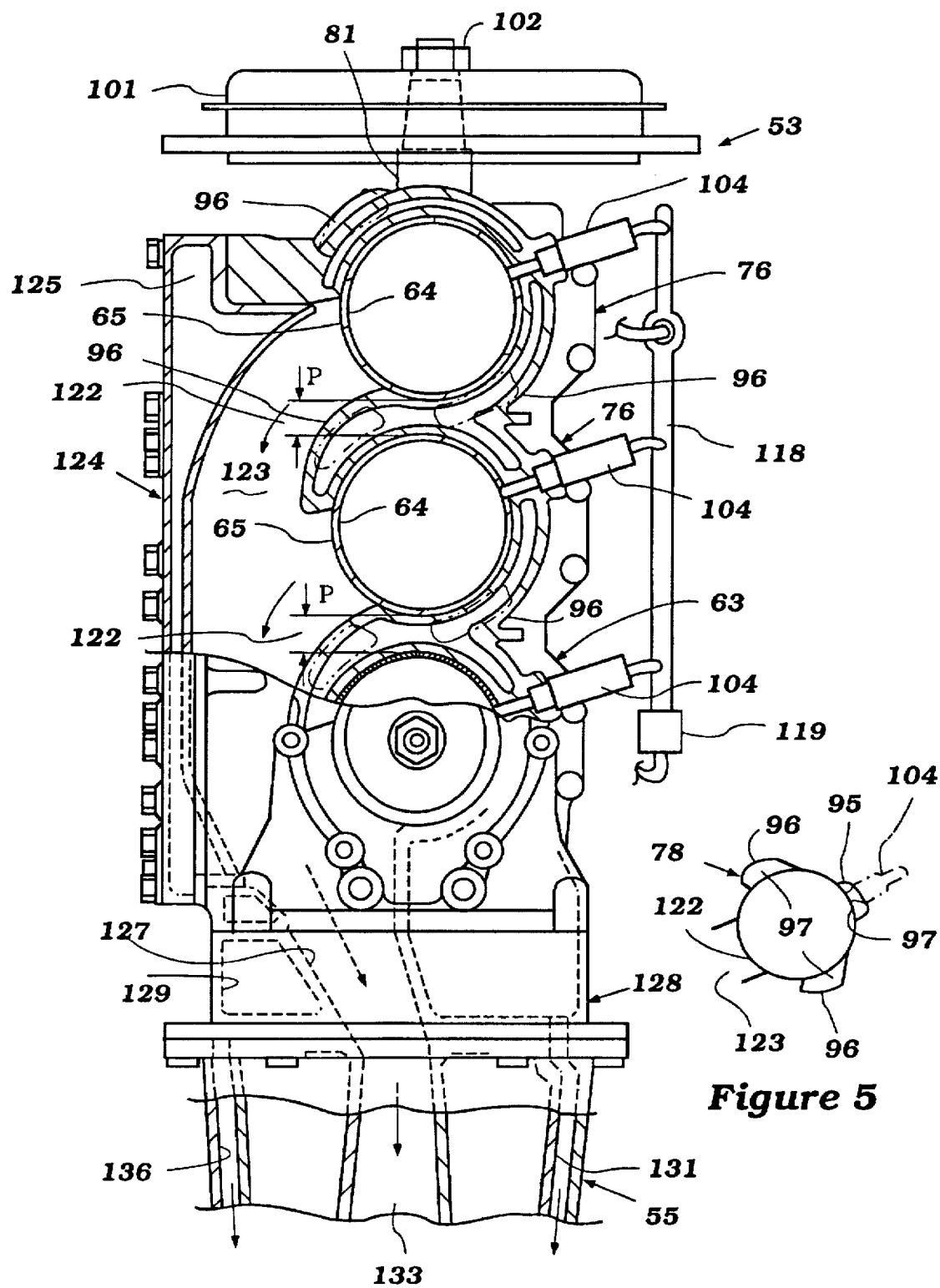
FIG. 4 is a partial cross-sectional view, in part similar to the lower right-hand view of FIG. 1 but with portions of the engine broken away so as to more clearly show the orientation of certain components.
FIG. 5 is a partially schematic view looking in the same direction as FIG. 4 and shows how the cylinder porting and injection arrangement is arranged so as to permit a more compact engine construction.

It should be noted, however, that the injectors 104 are positioned generally vertically above the center scavenge passages 95 for each cylinder. Also, the scavenge passages are rotationally offset, as best seen in FIGS. 7 and 4, so as to permit a relatively close spacing of the distance between these cylinders, indicated by the pitch dimension P in FIG. 4. This rotational offsetting permits close positioning of the cylinder bores 64 without interference between the scavenge passages 96, of adjacent cylinders and thus permits the use of a shorter engine than with other types of constructions.

Figure 2:
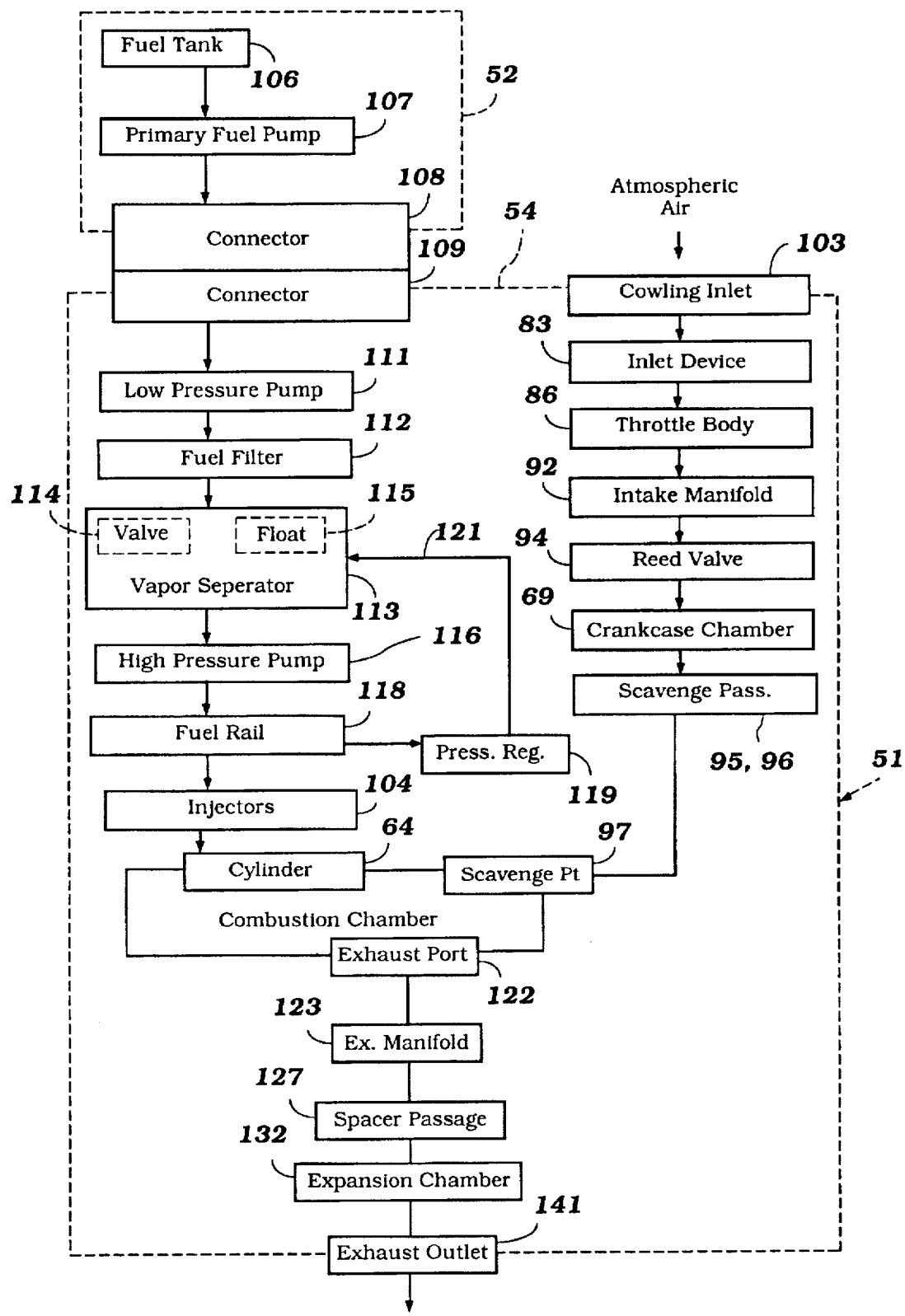
FIG. 2 is a partially schematic block diagram showing the fuel and air supply system for the engine.

Referring now primarily to FIGS. 1 and 2, the fuel supply system includes a portion which is mounted in the hull 52 and which is shown, in part only schematically. This includes a main fuel tank 106 that is mounted within the hull of the watercraft, and which includes a priming pump 107. The pump 107 delivers fuel to the one connector 108 of a quick-disconnect coupling. The coupler 108 communicates with a coupling 109 carried by the cowling tray 54 and which, in turn, delivers the fuel to an engine driven low-pressure fuel pump 111.

The low-pressure fuel pump 111, in turn, delivers fuel under pressure to a fuel filter 112. The fuel filter 112, in turn, delivers fuel to a vapor separator, indicated generally by the reference numeral 113. The fuel vapor separator 113 is comprised of a cavity in which a chamber is formed that is filled with fuel to a predetermined level controlled by means of a float that operates a needle valve 114 for maintaining a uniform level of fuel in the separator 113. The float is indicated schematically at 115.

The vapor separator 113 is provided with an atmospheric vent which may communicate with the air induction system to permit vapors separated from the fuel to be discharged from the vapor separator 113 without being discharged back to the atmosphere.

A high-pressure pump 116 is provided for drawing fuel from within the vapor separator 113 and delivering it to a main fuel line 117. In an actual physical embodiment, the high-pressure pump 116 may, in fact, be immersed within the vapor separator 113.

The high-pressure line 117, in turn, delivers fuel to the fuel injectors 104 through a fuel rail 118. A single fuel rail 118 supplies fuel to each of the injectors 104. A pressure control valve 119 is mounted in one end of the fuel rail 118 and regulates the pressure of fuel supplied to the injectors 104 so as to maintain a substantially constant pressure thereat. This pressure is maintained by dumping excess fuel back to the vapor separator 113 through a return line 121.

Referring again to FIGS. 3 and 4 and in addition to FIGS. 1 and 2, each of the cylinder bores 64 is provided with a respective exhaust port 122 which is generally diametrically opposed to the center scavenge port 97 associated with the center scavenge passageway 95. These exhaust ports 122 extend through the side of the cylinder block 63 and communicate with an exhaust manifold collector chamber 123 formed in the side thereof. This chamber 123 is defined between the cylinder block 63 and a cover piece 124 that is affixed thereto. The cover piece 124 is provided with a cooling jacket portion 125 which is supplied with coolant, in a manner to be described.

In this regard, it should be noted that both the cylinder block 63 and cylinder head 67 are formed with cooling jackets 126. These cooling jackets 126 communicate with each other, and also with the exhaust manifold cooling jacket 125. Cooling water is delivered to these cooling jackets 125 and 126 from the body of water in which the watercraft is operating through a coolant circulation system of a type well known in the outboard motor art. This cooling circulation system includes a water pump (not shown) that is mounted at the interface between the drive shaft housing member 56 and the lower unit 57. Water flows through these cooling jackets 125 and 126 and then is discharged back into the body of water in which the watercraft is operating, in a manner which will be described.

The exhaust manifold or collector section 123 extends downwardly and opens through a lower face of the cylinder block 63. There it communicates with an exhaust passageway 127 formed in a spacer or guide plate, indicated generally by the reference numeral 128, that is disposed between the engine 53 and the upper portion of the drive shaft housing 55. This spacer plate 128 may span the upper portion of the drive shaft housing and be contained within, at least in part, the lower tray 54 of the protective cowling. A water cooling jacket 129 is formed in the spacer plate 128 and encircles the exhaust passage 127 for assisting in cooling and silencing.

Figure 6:
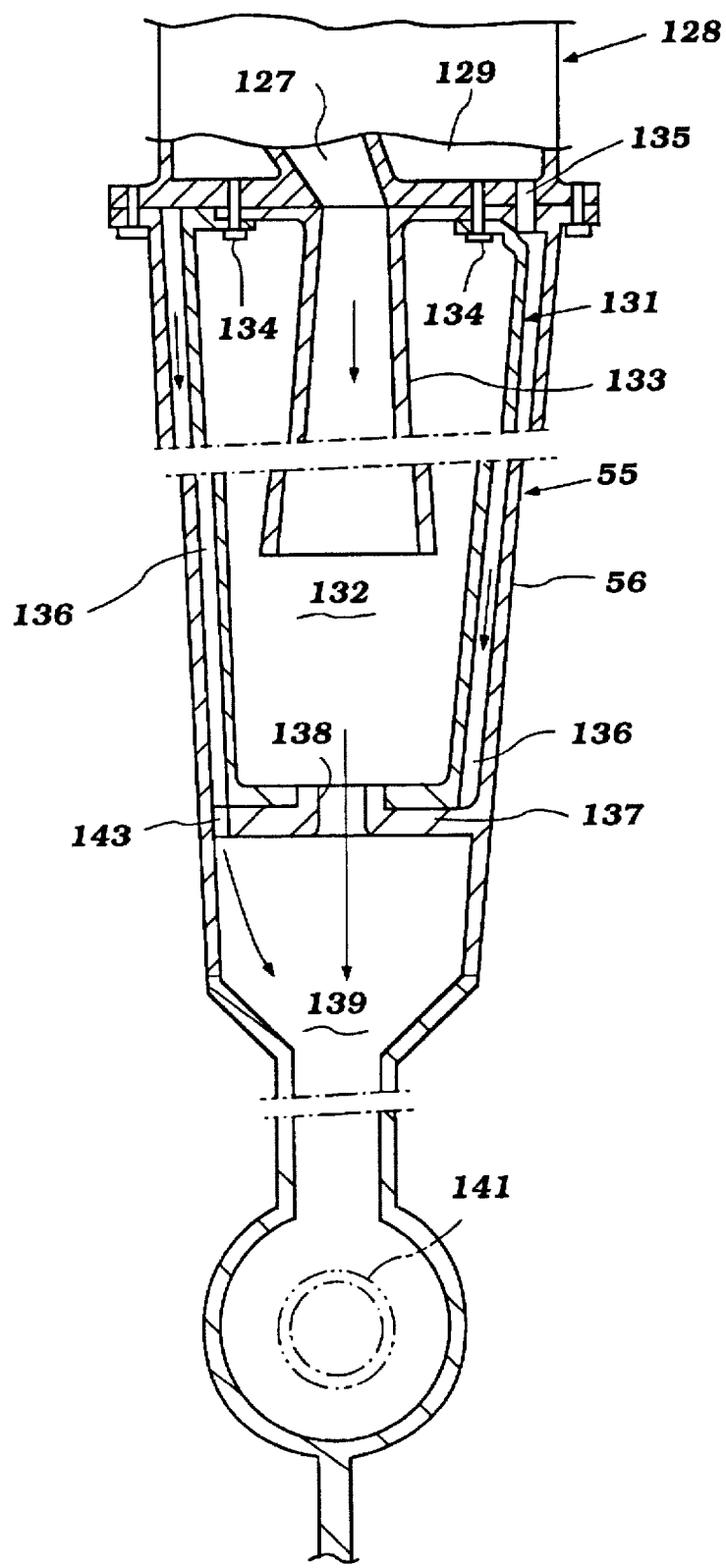
FIG. 6 is a partial cross-sectional view looking in the same direction as FIG. 4 and shows the lower portion of the outboard motor and hence constitutes a further extension of FIG. 4 and of the portion shown in the lower right-hand side of FIG. 1.

Continuing to describe the exhaust system now by added reference to FIG. 6, it will be seen that an inner shell 131 is contained within the upper portion of the drive shaft housing outer casing 56. This inner shell 131 forms an expansion chamber 132. An exhaust pipe 133 is connected to the underside of the spacer plate 128 by fasteners 134, and communicates at its upper end with the spacer plate exhaust passage 127 and at its lower end with the expansion chamber 132. Therefore, exhaust gases flow through this system into the expansion chamber 132 to provide silencing and cooling.

The spacer plate 128 is provided with one or more water drains 135 that communicate the cooling jacket 129 of the spacer plate 128 with a further cooling jacket 136 formed in the area between the inner shell 131 and the drive shaft housing 56. Water fills this chamber and cools the exhaust gases and precludes the transmission of heat to the drive shaft housing 55.

A wall member 137 extends across the lower part of the shell 131 and has an exhaust passage 138 from which exhaust gases may exit the expansion chamber 132 into a high-speed exhaust gas discharge chamber 139 formed in the lower unit 57. This chamber 138 communicates with a through-the-hub exhaust discharge passage 141 so as to discharge the exhaust gases from the engine through a through-the-hub exhaust gas discharge 142 formed in the hub of the propeller 58. Thus, the exhaust gases from the engine will be silenced by this underwater discharge.

The cooling jacket 136 formed around the expansion chamber 132 is formed with one or more drain passages 143 (FIG. 6) that permits engine coolant to mix with the exhaust gases in the chamber 139 and flow out with the exhaust gases back to the body of water in which the watercraft is operating.

In addition to the exhaust gas discharge already described, which may be considered to be a high-speed exhaust gas discharge, the outboard motor 51 may be provided with an above-the-water low-speed exhaust gas discharge. Such discharges are well known in this art and, for that reason, further description of them are not believed to be necessary to permit those skilled in the art to practice the invention.

It will be seen that the exhaust ports 122 are disposed so that their upper opening edge is disposed at a distance ES below the upper cylinder block surface 66 and the upper end of the cylinder bore 64. Also, it will be noted that the exhaust ports 122 open before the scavenge ports 97 open. Furthermore it will be seen that the upper edge of the exhaust port 122 is disposed below and further from the cylinder head assembly and block surface 66 than the injector axis x. This is significant in insuring that injected fuel will not pass out of the exhaust port 122 even when the injection duration is long. This occurs at high speeds and high loads.

Referring now to FIG. 7, certain additional auxiliary components for the engine 53 are illustrated and will be described. As has been noted, the engine is provided with a flywheel magneto assembly 101. This assembly also includes a starter gear that is engaged by an electrically operated starter 144 for electric starting of the engine. The engine 53 may also be provided with a lubricating system of any know type, and this may include a lubricant reservoir 145 mounted in proximity to the air inlet device 83.

Also, the throttle linkage, including the throttle link 89, may be connected to a pulser coil of an ignition system, indicated by the reference numeral 146, so as to provide spark advance, as is well known in this art.

The construction of the engine and outboard motor as thus far described may be considered to be conventional, except for the fuel injector 104 and its mounting and geometric relation to the pistons 72. This construction will now be described by particular reference to FIGS. 3 and 8–16.

Figure 3:
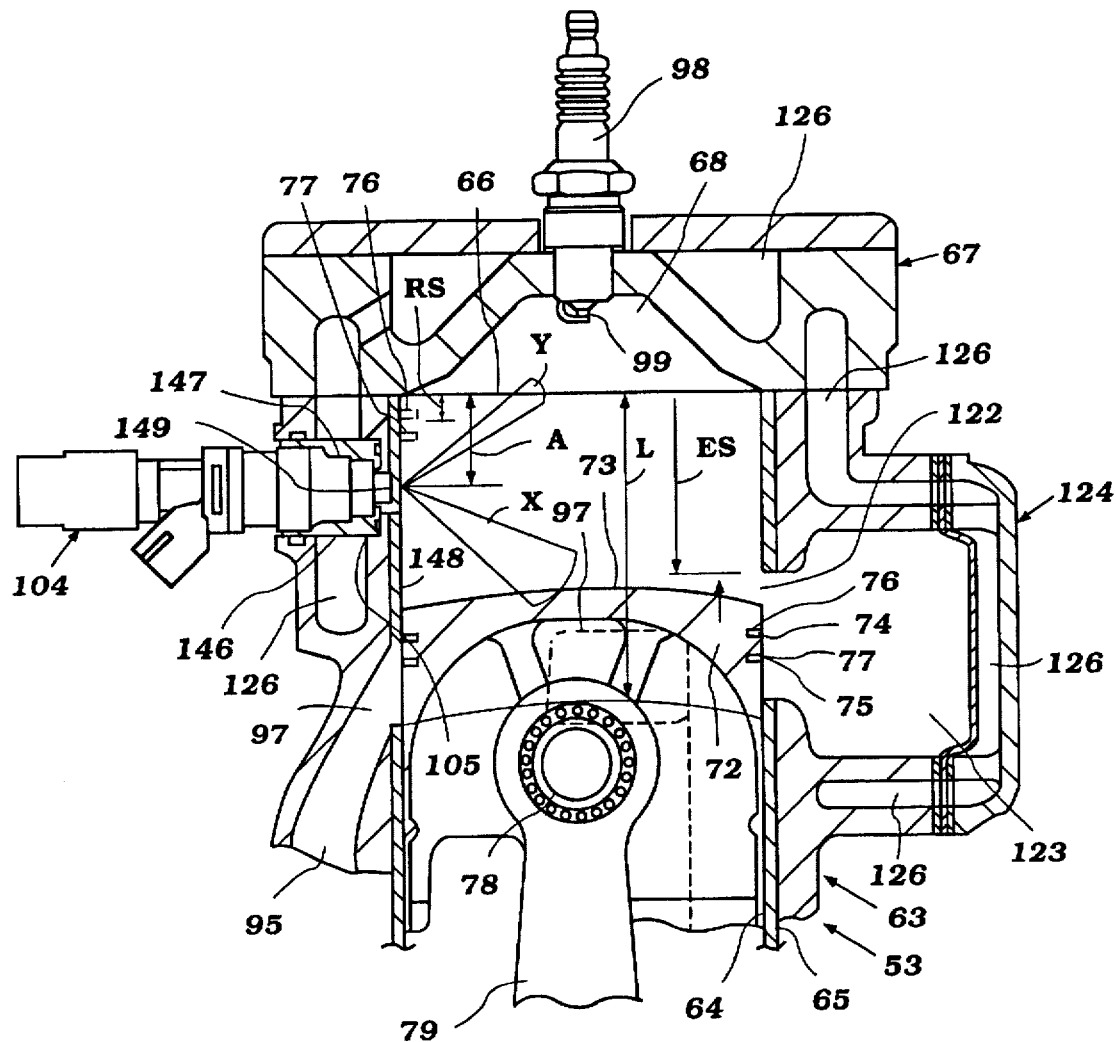
FIG. 3 is a partial cross-sectional view, generally similar to the cross-sectional view of FIG. 1 but showing the components in non-schematic fashion.
Figure 8:
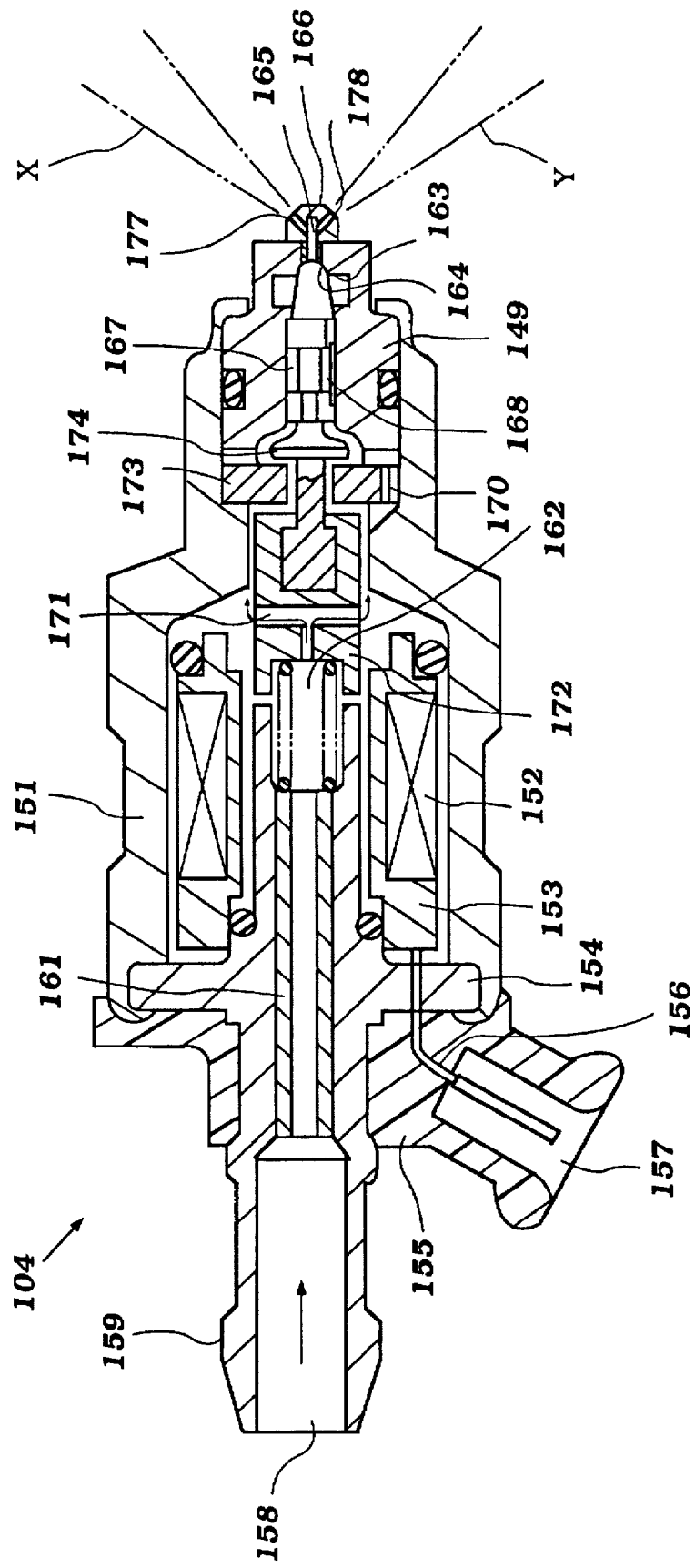
FIG. 8 is an enlarged cross-sectional view showing the fuel injector.
Figure 9:
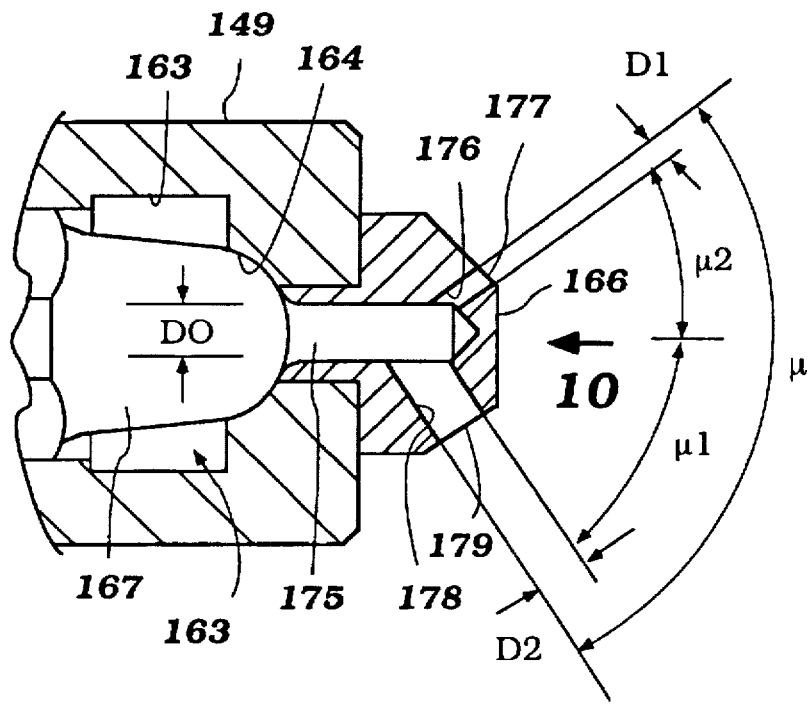
FIG. 9 is a still further enlarged cross-sectional view of the tip of the fuel injector nozzle portion so as to illustrate the spray nozzle openings therein.
Figure 10:
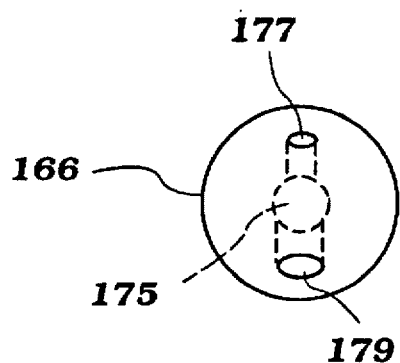
FIG. 10 is a view of the fuel injector nozzle portion on a smaller scale and looking in the direction of the arrow 10 in FIG. 9.

Referring first to FIG. 3, this shows the manner in which the injector 104 is actually mounted in the cylinder block 63. The cylinder block 63 is provided with a counter-bored portion adjacent each of its injector clearance holes 105. An injector mounting insert piece 146 is received in this recess and is sealed thereto by a circumferential O-ring 147 and an end O-ring 148. The injector 104 is mounted so that its discharge nozzle portion 149 registers with the cylinder bore opening 105 so that fuel will be sprayed therefrom in a pattern and at a flow rate and pressure which will be described later in more detail. Referring now primarily to FIGS. 8–10, each injector 104 is comprised of a main body portion 151 that defines an internal cavity in which a solenoid winding 152 is supported on a core 153. The core 153 is itself supported on an end closure 154 which is, in turn, sealed by a plastic cap 155. Conductors 156 extend from the winding 152 to a terminal portion 157 formed in the cap 155 for attachment to a controlled electrical source of power. This electrical source of power is controlled in a manner and in accordance with a strategy which will be described.

The end closure 154 is formed with an integral fuel delivery receiving portion 158 that is provided with a bayonetted end 159 so as to accommodate and provide a connection to the fuel rail 118 for supply of fuel to an internal passageway formed by a tubular member 161 that passes through the end closure 154 and which opens into a fuel receiving cavity 162 formed adjacent the nozzle end 149 of the injector. The nozzle portion 149 is formed with a fuel chamber 163 of annular configuration and which is centrally related to a valve seat 164.

The valve seat 164 communicates with a nozzle insert piece 165 that has a flow passage 166 extending therethrough, and which is valved by a pintle-type injector valve 167. The valve 167 is slidably supported by means of a polygonal-shaped portion 168 in a bore of the nozzle piece 149. As its rear end, an actuator element 169 is connected to the pintle valve 167, and it, in turn, has a flow passage 171 formed therein. Thus, fuel can flow from the passage formed by the tube 161 into a spring chamber 172, and then around the valve actuator 171 to the fuel chamber 163 for control by the pintle 164.

A stopper plate 173 having a flow opening 170 is contained at the base of the nozzle piece 149 and is engaged by a ribbed stop surface 174 of the pintle so as to limit the degree of opening of the pintle valve 167. The coil compression spring 172 normally urges the pintle valve 167 to its closed position. When the solenoid winding 153 is energized, the valve actuator 169, which acts as an armature, will be drawn inwardly to move the pintle valve 167 away from the valve seat 164 and permit flow from the discharge. The actual dynamics of this operation and on the effect on the pressure and flow velocity will be described later by reference to FIG. 17.

This flow discharge will now be described by primary reference to FIGS. 9 and 10, although it obviously also appears in FIG. 8.

It will be seen that the nozzle insert 166 is formed with a through opening 175 that has a diameter DO and which defines a general axis x which may be considered to be the central axis of the fuel injector nozzle portion 149, which is located, as previously noted, at a distance A (FIG. 3) from the cylinder bore end 66. This flow passage 145 is intersected by a first upwardly directed passage 176 that has an opening 177 in an outer face of the nozzle insert 166. The opening 177 has a diameter D1. The diameter D1 is smaller than the diameter DO. The lower edge of this opening 177 is disposed at an angle µ2 to the axis of the injector.

In addition, the nozzle insert 166 is formed with a second passage 178 which is generally downwardly directed and has an opening 179 in the lower face thereof. The opening 179 has a diameter D2 which is greater than the diameter D1, but also less than the diameter DO. The upper edge of this opening 179 is disposed at an angle µ1 from the injector axis. This angle µ1 is greater than the angle µ2, for a reason which will be described. The total angle of spray provided by the openings 177 and 178 is subtended by the are µ, which is preferably not less than 45°. In the specific embodiment, the angle µ is about 100°, while the angle µ2 is about 45°, while the angle µ1 is about 55°.

As has been mentioned, the fuel pressure supplied to the injectors 104 is regulated by the regulator 119. Preferably, the fuel supplied to the injector is adjusted to be in the range of 300–1000 kilopascal. When this is encountered, then the pressure in the recess 163 will also be at this same pressure when the pintle valve 167 is closed. However, if the injector is opened, the pressure will drop, and the pressure in the chamber 163 will then be about half of the former pressure. The pressure losses are such so that the flow of fuel through the injector openings 177 and 178 is at a velocity of in the range of 10–30 meters per second, and preferably about 20 meters per second. This will control the maximum penetration of the fuel into the cylinder, and will be as described shortly.

Figure 11:
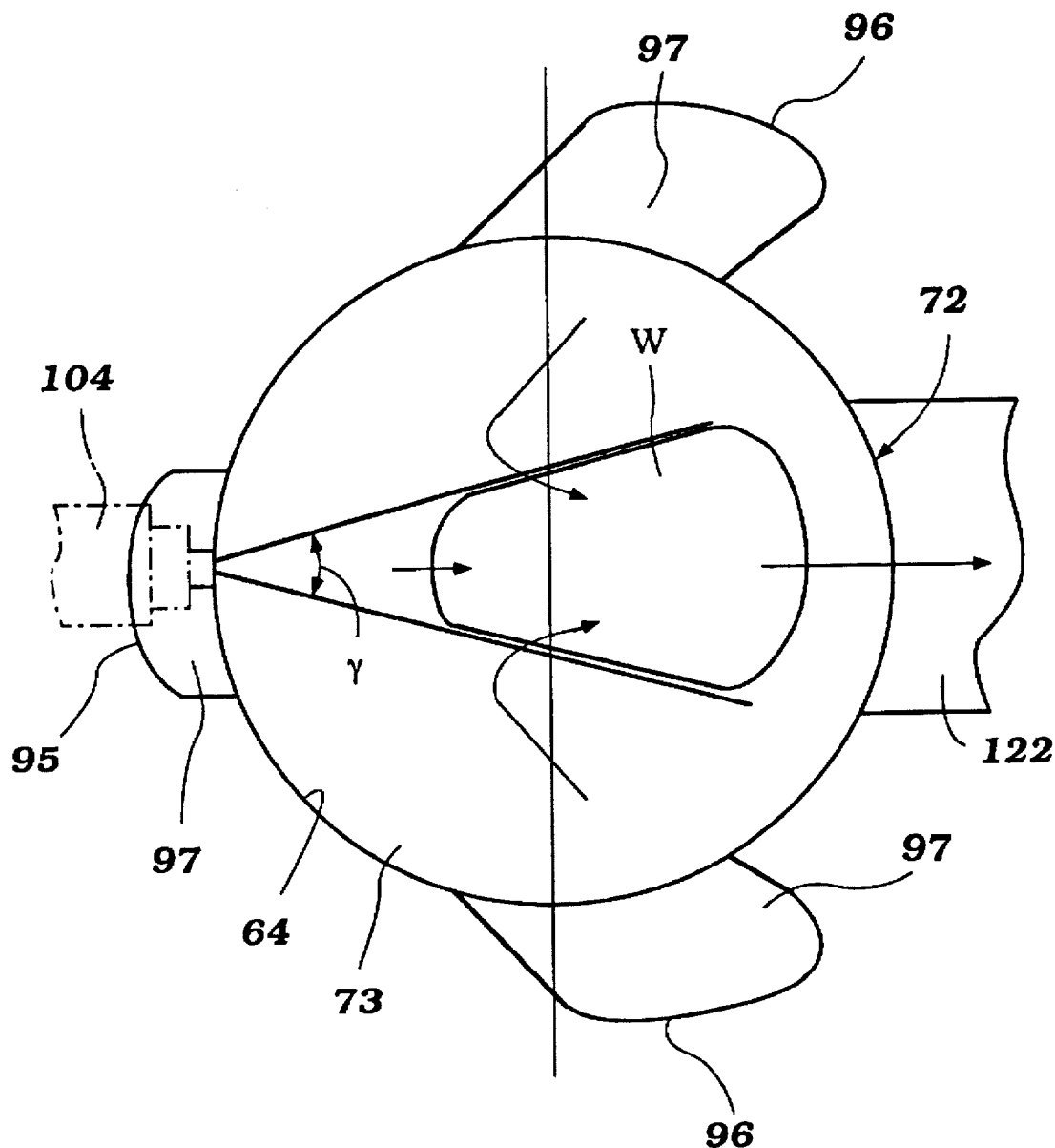
FIG. 11 is a top plan view showing how the spray pattern causes the fuel to impinge upon the head of the piston.

As may be seen in FIGS. 3 and 11, the spray relationship is such that a portion of the fuel, that is, specifically that flowing from the nozzle opening 178, will be directed toward and impinge upon the piston head 73. The remaining fuel spray, which is preferably smaller in volume, will be directed toward the cylinder head recess 68, and specifically, the spark plug gap 99. As a result of this spray pattern, there will be ensured the presence of the stoichiometric mixture at the vicinity of the spark gap 99 when the spark plug 98 is fired. In addition, a homogeneous mixture will fill the remainder of the combustion chamber, which may or may not be stoichiometric, depending upon the engine running condition.

As may be seen in FIG. 11, the spray pattern is such that the wetted area of the piston head 73 will be as indicated at W in this figure. The spray angle in this plane is indicated as $\lambda$. As has been previously noted, the pressure at which the fuel exits the nozzle openings 177 and 179 will be less than that which is supplied to the injector. This may be best understood by reference to FIG. 17 which is a graphical view that shows, from top to bottom, the output of electrical current and the energization of the solenoid winding 152, the lift of the pintle 167, the pressure in the chamber 163 and the actual pressure that exists at the discharge nozzle openings 177 and 179.

As may be seen at the top view, the upper right-hand view at the time period $t_0$, the voltage is applied and it increases at a slope m1 to the maximum voltage and then is held constant for a time T. At the expiration of the time T, which time period is set in response to the amount of fuel which should be injected, the voltage drops along a curve n1 beginning at the time period $t_2$ until the voltage falls off to zero.

In response to this voltage increase, the needle or pintle valve 167 begins its lift at a time delay $t_d$ at a rate indicated by the slope m2 until full lift is accomplished during the time period $t_1$. Also, when the winding voltage is dropped at the time $t_2$, there is a delay period $t_3$ before the inertial effects cause the injector valve 167 to be closed by the combined discontinuance of electrical power and the action of the spring 172. Thus, closing does not begin until the time $t_4$ which results in a total valve opening time of $T_5$. The rate of closing is also indicated by the slope n2 so that the actual closing of the valve does not occur until the time $t_6$ which means that there is a time period $t_7$ for the pintle valve 167 to close. Hence, the total time of opening of the pintle valve is indicated at $t_8$.

Figure 17:
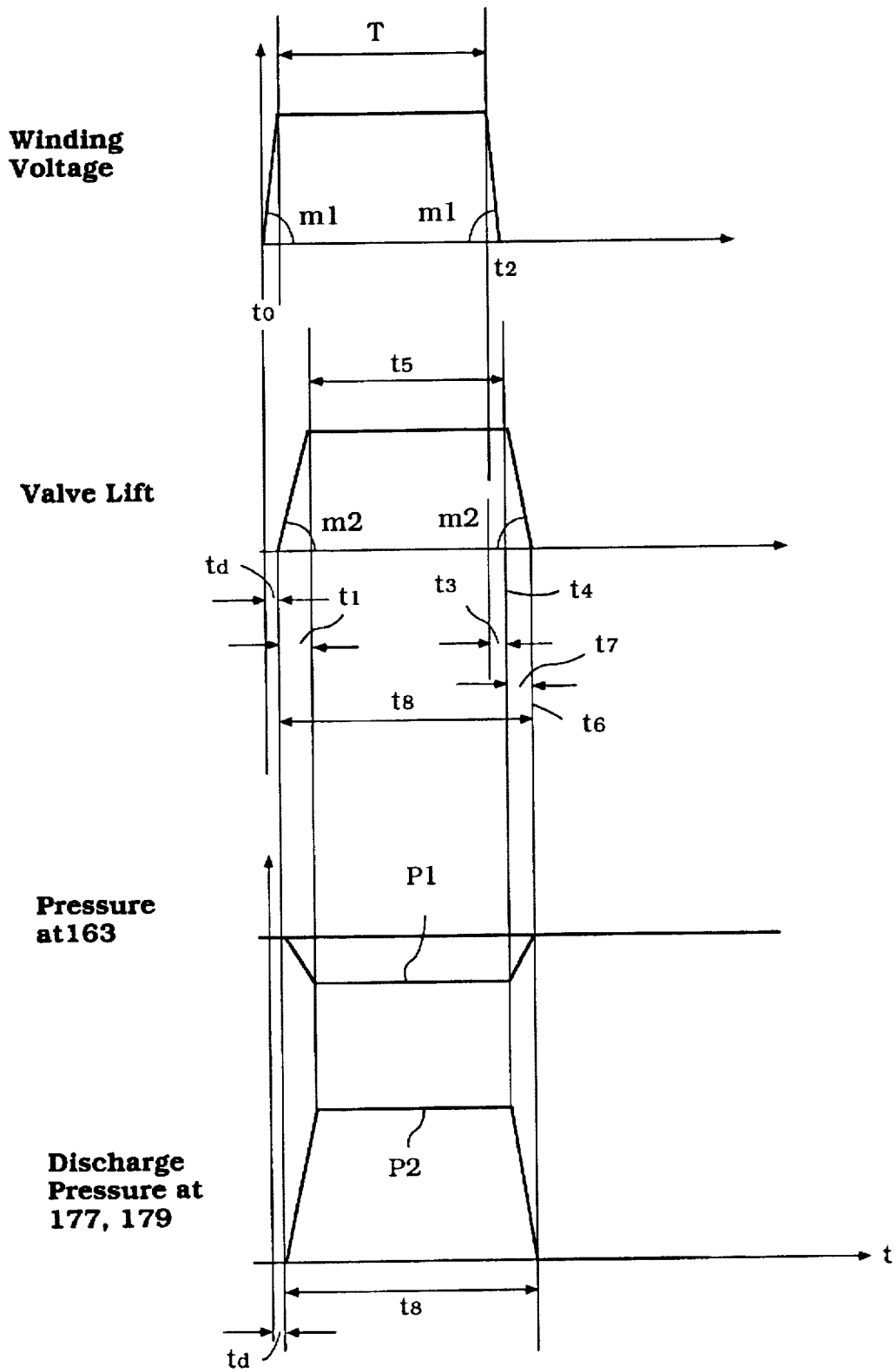
FIG. 17 is a graphical view showing voltage applied to the solenoid of the injector valve, the degree of life of the injector valve, the pressure in the supply chamber for the injector and the pressure at the nozzle tips of the injector with relation to time during a single injection cycle.

The effect of this operation of the pintle valve 167 on the pressure at both the chamber 163 of the injector and at the nozzle ports 177 and 179 will now be described by reference to the lower two views of FIG. 17.

The pintlement view of this figure indicates that the pressure P1 in the chamber 163 is maintained at the regulated pressure until the pintle valve actually begins to open after the time delay $t_d$ from the time $t_0$. As soon as the pintle valve 167 begins its opening, the pressure in the chamber 163 will drop as shown in this figure and will then stabilize once the pintle valve 167 is fully opened until its closing operation begins. When closing begins, the pressure will again build up and will reach its peak at the time when the pintle valve is closed.

In the same fashion, but in an opposite direction, the opening of the pintle valve will cause fuel to be injected from the nozzle ports 177 and 179 at a pressure P2 which follows a curve that is the opposite or inverse of the curve P1, but has a greater difference in magnitude since the pressure is going from zero to maximum and back rather than from a high pressure to a reduced pressure. The actual pressure is such that the velocity of discharge will be in the range previously indicated and that is in the range of 10 to 30 meters per second. This is important in controlling the degree of penetration of the fuel into the combustion chamber 68 and also toward the exhaust port 122, as will become apparent by reference to FIGS. 13–16 and the timing diagram of FIG. 12.

The importance in the relationship of the angles of injection from the injector nozzles 177 and 179 will now be described by particular reference to FIGS. 13–16, which show the condition during various portions of the piston stroke. As has been previously noted, the injector axis, indicated at x in these figures, is such so that the angle $\mu 2$ between this axis x and the upper end Y of the spray pattern from the upper directed nozzle opening 177 will be directed toward the gap of the spark plug 98. The actual spray axis from the opening 177 is conical, and is indicated at Y1 in this group of figures. The lower edge of the spray pattern is at the angle 132 from the axis x. As has been previously noted, the amount of fuel in the spray pattern Y is less than that from the spray pattern X associated with the nozzle port 179.

Referring to that particular nozzle pattern, it has been previously noted that the upper edge of this spray pattern is at the angle $\mu 1$ below the spray axis x. It should be noted that this angle is such that it is less than the angle between the spray axis x and the upper edge of the exhaust port 122, which angle is indicated at EX1. Hence, the spray pattern X is such from the nozzle port 179, which spray pattern is also conical and indicated at X1, so that it will be directed below the upper edge of the exhaust port under all conditions. The lower peripheral extent of this spray pattern from the lower nozzle port 179 is at a point $\beta 1$ so that the spray will contact the head of the piston during a substantial portion of the spraying interval.

Figure 13:
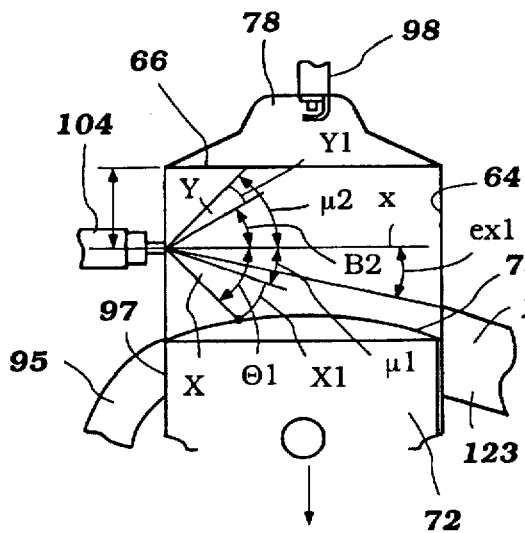
FIGS. 13, 14, 15, and 16 are cross-sectional views, in part similar to FIG. 3 and show the relationship of the spray pattern and fuel spray to the piston during the various portions of the stroke and may also be understood by reference to FIG. 12.

Thus, the spray interval is chosen so that the fuel from the nozzle 104 will be directed to the combustion chamber recess 68, and the area around the spark plug gap 99, and on the head 73 of the piston 72, but will be blocked from passing out of the exhaust port 122. Therefore, the timing of fuel injection is begun when the piston is on its downstroke, as shown in FIG. 13, but so that the penetration of the fuel spray will not reach the exhaust port opening 122. The condition shown in FIG. 13 is the condition at the start of injection when the engine is running at high-speed, high-load. This is the earliest time of injection and the most difficult condition. It will also be seen from FIGS. 11 and 13–16 that the Schnurl type scavenging flow assists in carrying the initial injection fuel flow away from the exhaust port 122.

Figure 14:
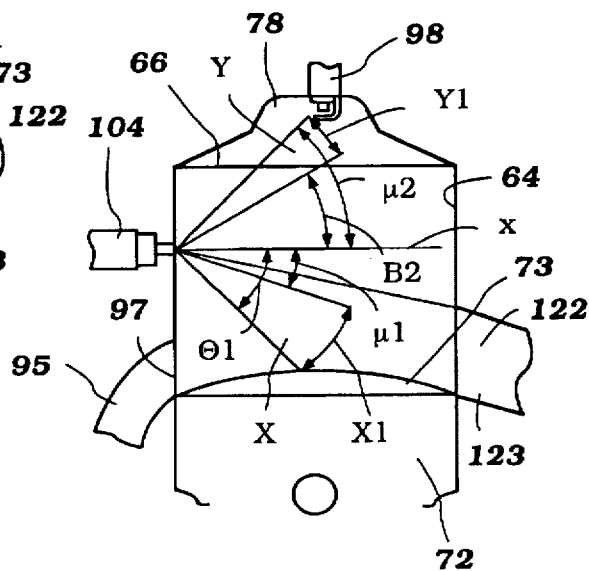
Figure 15:
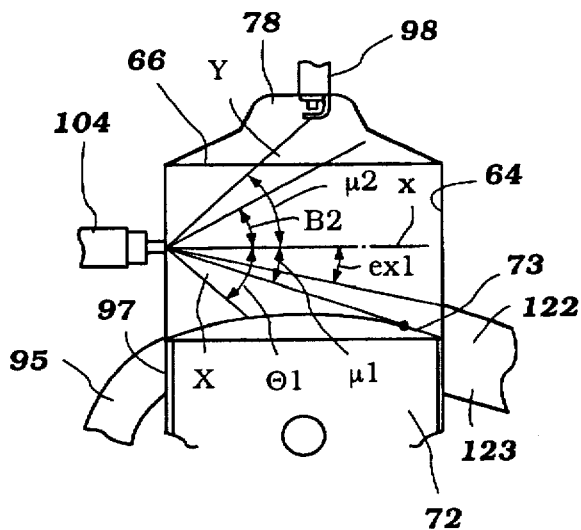
Figure 16:
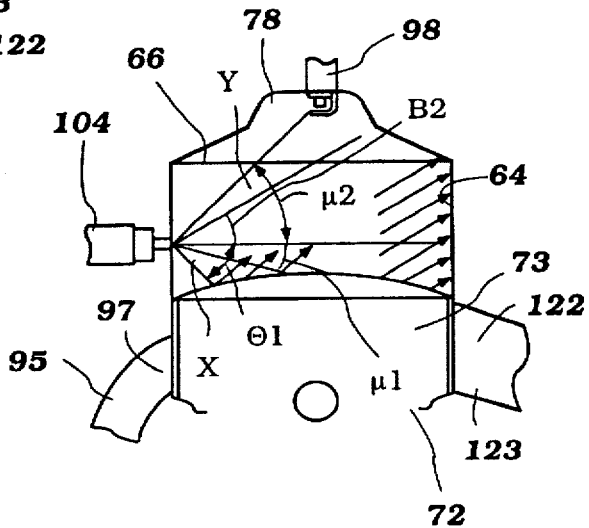

As the piston continues to move downwardly to the position shown in FIG. 14, and is, at this time, at its bottom dead center position, the fuel which impinges on the piston head 73, will be directed upwardly away from the exhaust port in large part due to the scavenging flow. Also fuel impingement on the piston head 73 will occur first on the side well away from the exhaust port, and will only impinge upon the head of the piston at the side toward the exhaust port at the end of the stroke and after the piston has begun to move toward its top dead center position, as shown in FIG. 15. Of course, at this time the exhaust port 122 will be closing to reduce the flow through it.

The head 73 of the piston is highly heated, and the fuel spray impinging on it will have two important benefits. First, the fuel that evaporates and bounces off will be directed away from the exhaust port and toward the spark gap 99 assisted by the scavenging air flow. In addition, the impingement of the fuel on the piston head 73 will also cause a cooling effect on the piston so as to reduce the likelihood of piston burning, even under high-load, high-speed conditions.

The timing of the fuel injection and the relationship of the piston to the location of the injector axis x is quite important in ensuring maximum performance of the engine and adequate fuel supply under all running conditions. The various running conditions will be described shortly by reference to FIG. 12, but before describing that figure, these critical relationships will be detailed.

The details are such that the location of the injector axis x at the distance A from the cylinder bore surface 66 relative to the stroke of the piston and the distance RS from the lowermost edge of the piston ring falls into the following relation relative to bottom dead center position L of the piston. This ratio should preferably be in the range so that RS<A<0.3L. This ratio has been found to provide adequate time for fuel injection under all conditions, and insurance against the fuel spraying out of the exhaust port 122.

To further ensure this, the distance between the upper peripheral edge of the exhaust port and the cylinder head cylinder block surface 66 (ES) should be such that 0.35 ES<A<0.65 ES. These relationships will ensure this result aided by the injection timing, now to be described.

Figure 12:
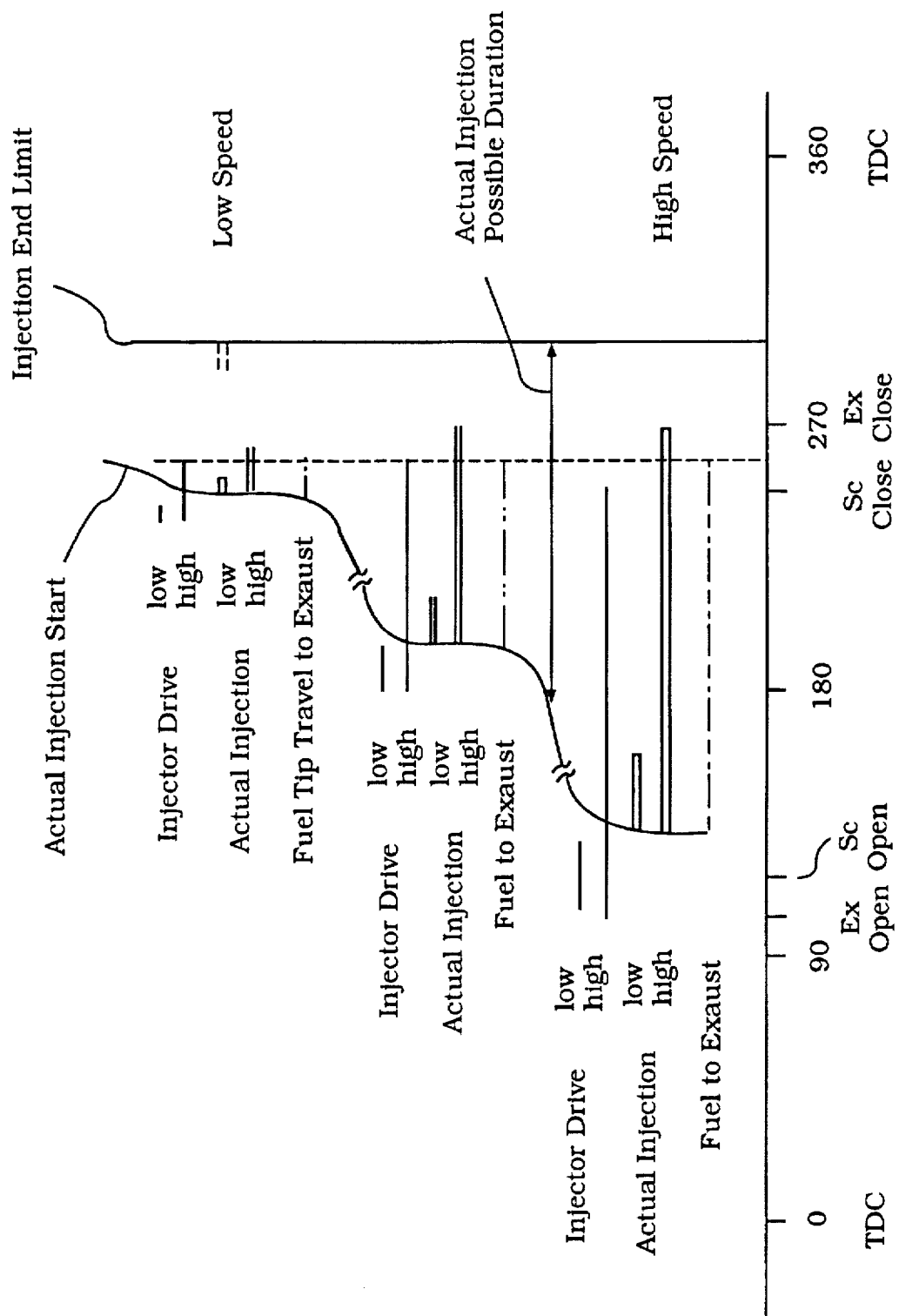
FIG. 12 is a timing diagram showing the events and sequence of operation in accordance with this embodiment of the invention.

As has been noted, in addition to the location of the fuel injector 104 along the cylinder bore axis in relation to the piston travel, the spray pattern is also important. As has been noted, the spray range should encompass an arc at least as great as 45° and preferably 100°, and also more fuel should be sprayed toward the piston rather than toward the cylinder head recess 78 and spark gap 79. FIG. 12 shows the timing cycle during a complete revolution from top dead center to top dead center, the injector location, the timing of exhaust port opening and scavenge port opening, the timing of scavenge port closing and exhaust port closing, and the point in time when the piston will pass the fuel injector, which determines the ultimate injection end timing.

As may be seen and as has been described by reference to FIG. 17, in given engine conditions, the injector actuating signal precedes the actual injection timing because of the lag. However, by timing the injection so as to occur earlier and earlier as the engine speed and load increases, it can be ensured that the travel of fuel from the tip of the injector to the exhaust port can be ensured that there will be no fuel that passes out of the exhaust port under all running condition. As may be seen from FIG. 12, the timing of the fuel injection is done so that the actual discontinuance of the voltage signal to the injector is terminated slightly before exhaust port closing so that the actual fuel injection will terminate slightly before the exhaust port 122 is closed by the movement of the piston 72.

Thus, to vary the amount of fuel supplied to the engine, injection timing is begun sometime after the exhaust port opens and at a time which depends upon engine load. The higher the load and speed, the earlier the injection timing pulse begins. Although this means that injection occurs when the exhaust port 122 is opened, none of the injected fuel will pass out of the exhaust port 122. This is possible because of the arrangement of the components as thus far described the pressure and speed at which the fuel is injected, the scavenging action and the location of the fuel injector axis x at the distance A from the top of the cylinder bore 64.

As has been noted, in addition to the location of the fuel injector 104 along the cylinder bore axis in relation to the piston travel, the spray pattern is also important. As has been noted, the spray range should encompass an arc at least as great as 45° and preferably 100°, and also more fuel should be sprayed toward the piston rather than toward the cylinder head recess 78 and spark gap 79.

Although the specific, basic control strategy by which the engine 53 is operated may be of any known type, the general components utilized in the engine management system will be described, referring back to FIG. 1. These components include a number of sensors of sensing both engine running conditions, as well as ambient conditions. Of course, it should be apparent to those skilled in the art, that the sensors which will be described are only typical of those types of sensors which can be utilized with the engine management system. Basically, the important feature of the invention is the timing strategy for fuel injection and the orientation and location of the fuel injector 104 and its spray paths X and Y.

Referring now specifically to FIG. 1, the system includes a main ECU 181 which controls through appropriate output signals the timing and duration of fuel injection from the fuel injector 104, which timing has been described by reference to FIG. 12, the timing of firing of the spark plugs 98, and also the operation of the high-pressure fuel pump 116, so as to control its output.

The engine condition sensors include a throttle position sensor 182 that is associated with the throttle valve 87 and outputs a signal to the ECU 181 that indicates the operator demand, or alternatively, the load on the engine.

Positioned in the intake manifold 93 is an intake air temperature sensor 183 which also outputs its signal to the ECU 181.

As is well known in two-cycle engine practice, air flow to the engine may be accurately determined by measuring crankcase pressure at certain crank angles. Therefore, there is provided a crankcase pressure sensor 184 in the crankcase chamber 69, and which outputs a signal to the ECU 181 indicative of crankcase pressure.

The crank angles for setting both timing of the various firing intervals of the spark plugs 98 and the injectors 104 and for indicating engine speed, is supplied by a crank angle sensor 185 which cooperates with a toothed gear on the crankshaft 81 so as to output appropriate signals indicative of crank angle to the ECU 181. By summing these crank angle pulses in a given time period, it is also possible to measure engine speed.

There is also provided an in-cylinder pressure sensor 186 that will output signals to the ECU 181 indicative of the actual pressure in the combustion chamber 68. This signal may be utilized for appropriate engine controls in accordance with any strategy known in the art.

There is further provided a knock detector 187, also mounted in the cylinder head 67, and which outputs its signal to the ECU 181. Appropriate knock control strategies may be employed for engine control.

The control system for the engine may also include a feedback control system that employs an oxygen sensor, indicated by the reference numeral 188. The oxygen sensor 188 is disposed in a chamber 189 that communicates with the cylinder bore 64 or combustion chamber recess 68, and which receives exhaust gases. These exhaust gases are then discharged into the exhaust manifold 123 through a check valved passageway 191. The output from the oxygen sensor 188 can be utilized to determine whether the air-fuel ratio is as desired, in a known manner.

Engine temperature is measured by a cylinder block engine temperature sensor 192 that is mounted in proximity to the cooling jackets afore-referred to, and which will output a signal indicative of engine operating temperature for appropriate control.

It may also be desirable to measure the temperature of the cooling water which is delivered to the engine, and for this purpose, there can be provided a water inlet temperature sensor 193.

Under some conditions, it may also be desirable to be able to read the condition of the transmission which is in the lower unit 57 for driving the propeller 58, and a transmission condition sensor 194 is provided for this purpose.

In addition to those engine and engine-related sensors, there may also be provided an exhaust back pressure sensor 195. A trim angle sensor 196 senses the angle of trim of the outboard motor, and also outputs its signal to the ECU 181. Ambient conditions, such as atmospheric air pressure, may be sensed by a sensor 197, and also outputs its signal to the ECU 181. These various sensors and their signals can be utilized in accordance with any desired control strategy.

In some instances, the delayed effect of passage of the fuel to the exhaust port 122 can also be further promoted by utilizing an arrangement wherein the head 73 of the piston 72 is provided with a fuel collecting recess. FIGS. 18–22 show such an arrangement with these views corresponding to FIGS. 11 and 13–16, respectively. Except for the shape of the piston head, this embodiment is the same as previously described and, therefore, components which are the same have been identified by these same reference numerals and will be described again only insofar as is necessary to understand the construction and operation of this embodiment.

Figure 18:
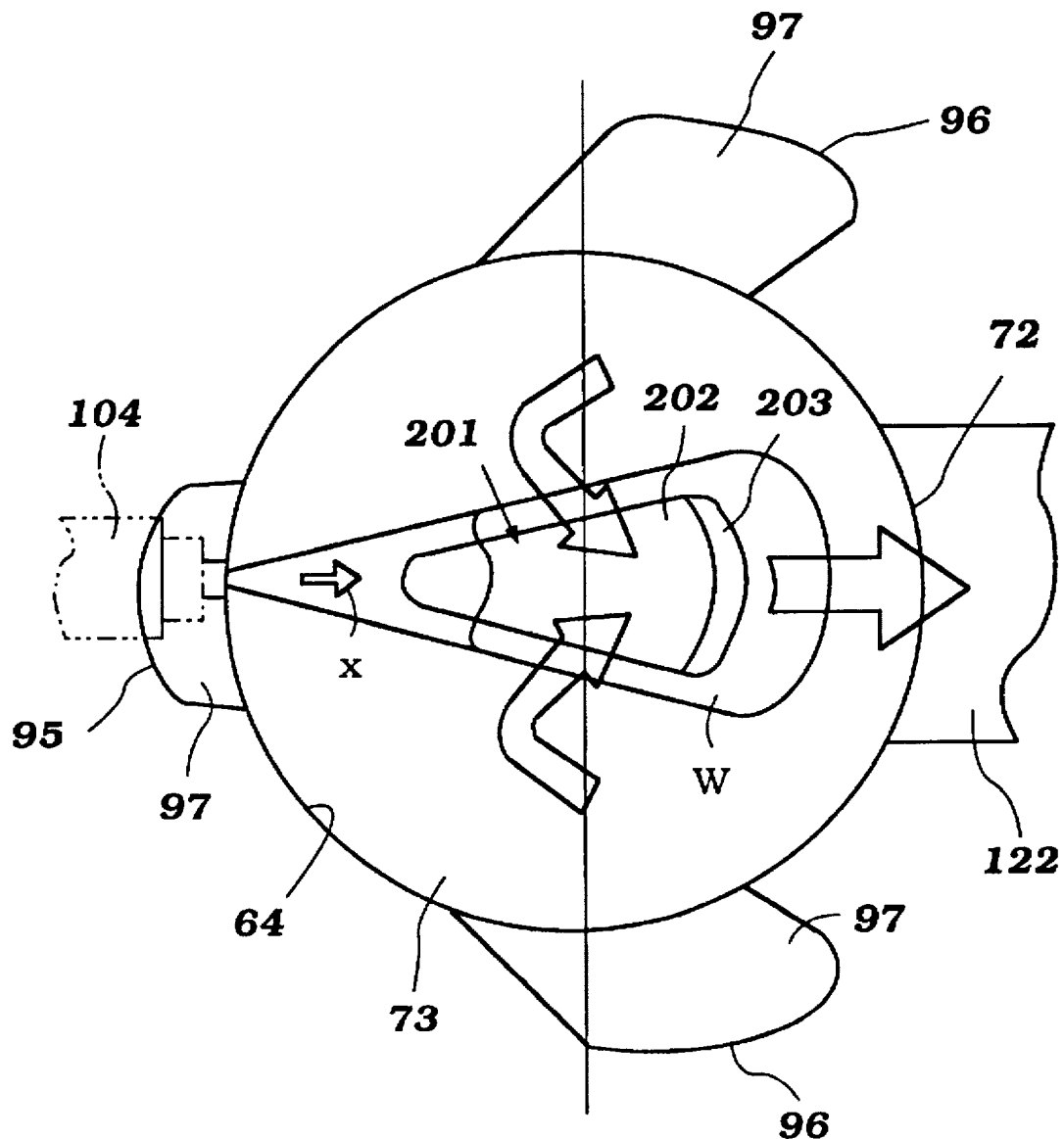
FIG. 18 is a top plan view, in part similar to FIG. 11 and shows another embodiment of the invention and another way in which the control of fuel from the head of the piston can be controlled.

In this embodiment, the wetted area of the piston W, which, as has been noted, is wetted by the injector spray X is provided with a recess or bowl, indicated generally by the reference numeral 201. This recess or bowl has a generally pie-shaped configuration as shown in top plan view and which is comprised of a wall 202 that slopes generally downwardly from the area adjacent the injector spray axis x. This wall may extend across the diametral plane of the cylinder bore 64 as shown in FIG. 18, or may extend only on the exhaust port side of the piston head 73. This wall 202 slopes downwardly and terminates at a vertically upwardly inclined wall 203.

As a result of this configuration, fuel which is injected into the cylinder bore 64 and against the head 73 of the piston 72 will tend to flow into the wall 201. This will capture the fuel and delay its evaporation until after the exhaust port has been closed in addition to utilizing the aforenoted features for preventing escape of fuel through the exhaust port 122. Again, the Schnurl-type scavenging assists in this type of operation.

FIGS. 19–22 correspond to FIGS. 13–16, respectively, and show the corresponding positions which are effective in controlling the movement of the fuel within the combustion chamber.

Figure 23:
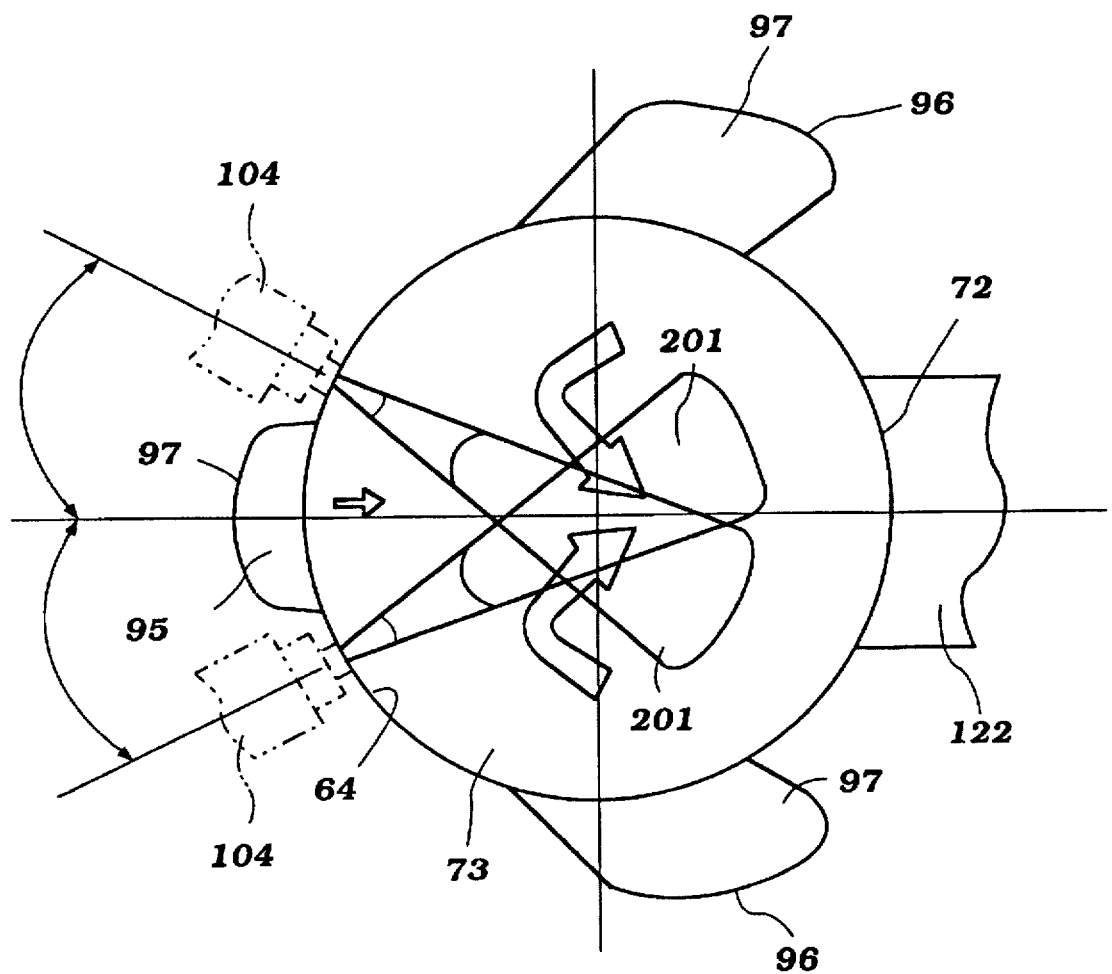
FIG. 23 is a top plan view, in part similar to FIGS. 11 and 18, and shows another embodiment wherein the invention may be employed in conjunction with a dual fuel injector engine.

In the embodiments as thus far described, the engine has been provided with only a single fuel injector. Although the described construction is effective in providing adequate fuel to be injected without passing through the exhaust port 122 through the use of a single fuel injector, FIG. 23 shows an embodiment wherein there are provided a pair of fuel injectors, each indicated by the same reference numeral previously applied. In this embodiment, the fuel injectors are utilized with a piston that has a recess associated with each injector as shown in the embodiment of FIG. 22.

With this arrangement, rather than the injectors 104 being placed directly over the center of the center scavenge passage 75, each is disposed on one side of the center scavenge passage 75 adjacent the side scavenge passages 76. The recesses 201 are similarly configured so that the scavenging flow will cooperate with each recess to direct the fuel of flow from the piston head 73 in the manner shown in this figure. From the foregoing description, it is believed unnecessary to further describe the construction and operation of this embodiment.

In the embodiments of the invention as thus far described, the fuel injector has been provided with a stopping mechanism that requires some form of bypass around it and the stop such as the passage 170. Reference may be had to FIG. 8, and the elements 174 and 173. As may be seen, there must be provided a bypass passageway 170 around the seating engagement, or the seating surface 174 must be provided with flow grooves.

Figure 24:
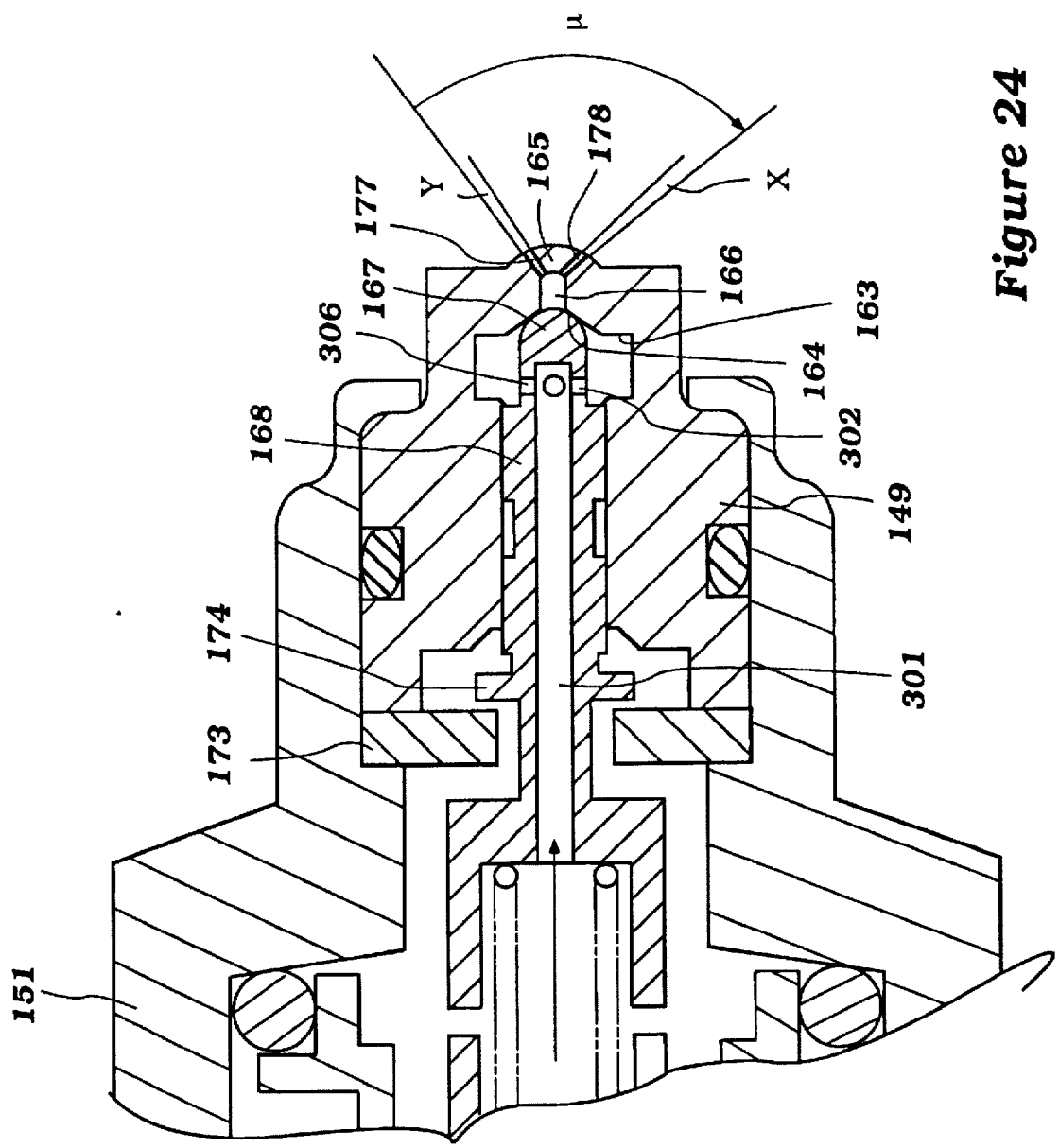
FIG. 24 is a partial cross-sectional view in part similar to FIG. 9 and shows a fuel injection nozzle constructed in accordance with another embodiment of the invention.

FIG. 24 shows another embodiment wherein a passageway, indicated generally by the reference numeral 301, extends through both the valve actuator element or armature 169, and the pintle portion 167. The end of this passageway 301 is intersected by radially extending passageways 302 that open directly into the fuel chamber 163 of the nozzle piece so as to facilitate fuel delivery to this point. This construction may be utilized with the embodiments as thus far or hereinafter described.

Although the embodiments of the invention as thus far described have all been related to the application of the invention to an outboard motor, the invention is also susceptible of use, as has been mentioned, in a wide variety of other applications for internal combustion engines. FIGS. 25–28 show another embodiment of the invention wherein an engine constructed and operated in accordance with this embodiment is indicated by the reference numeral 501 and is utilized as the power plant for a motorcycle, indicated generally by the reference numeral 502. This is another potential application for the invention as is the application to various other types of vehicles including land vehicles.

Figure 25:
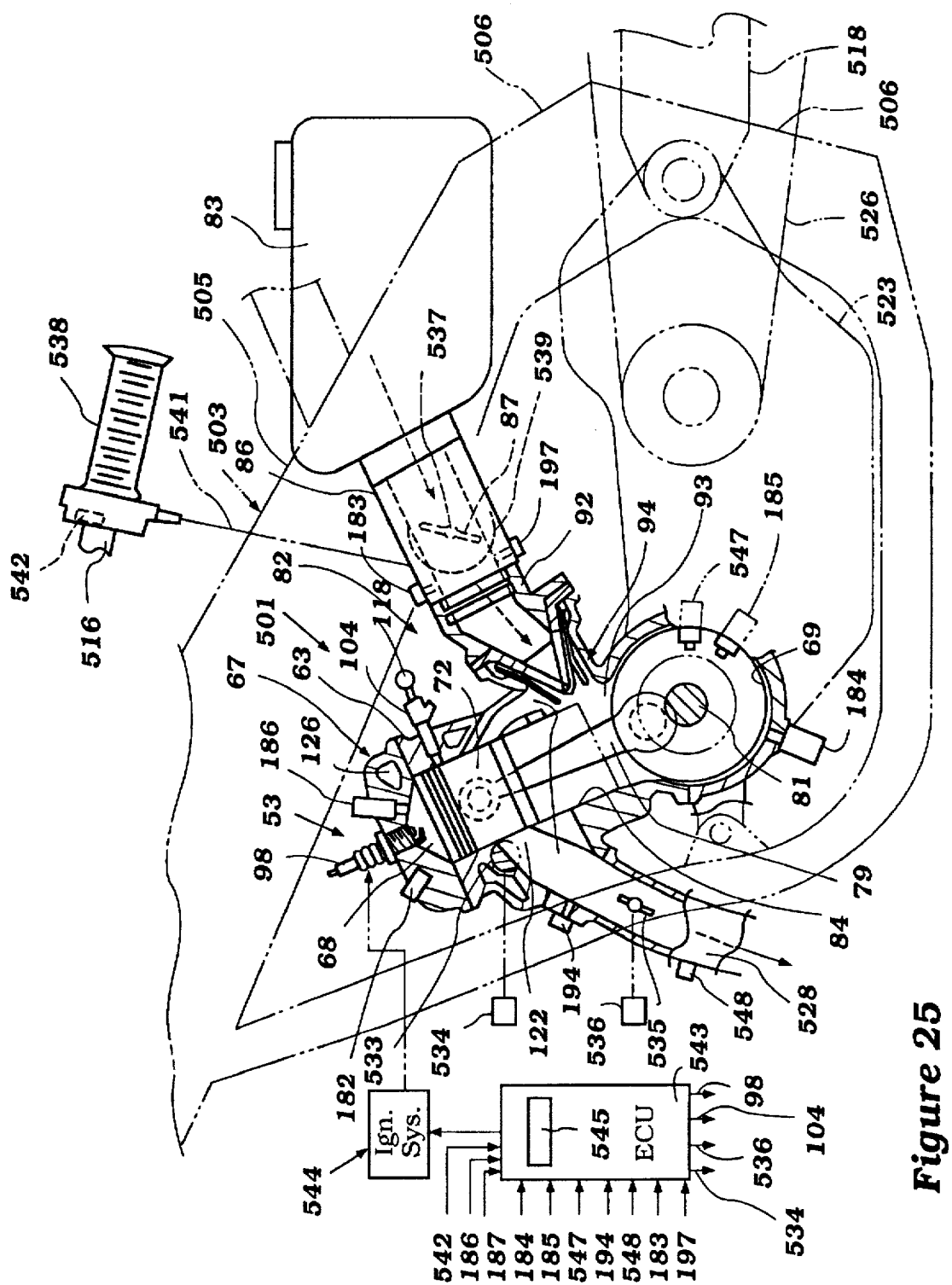
FIG. 25 is a side elevational view of a motorcycle showing another environment in which the invention may be utilized.

In order to set the environment for the invention, the construction of the motorcycle 502 will be described primarily by the reference to FIG. 25 where it is shown in solid lines. The motorcycle 502 is comprised of a built-up frame assembly, indicated generally by the reference numeral 503, and which includes a head pipe 504. Extending rearwardly and downwardly from the head pipe 503 are a pair of main frame members 505 which terminate at a rear bracket 506 to which they are rigidly connected, as by welding.

A pair of downtubes 507 extend downwardly from the forward portion of the main tubes 503 to which they are fixed as be welding. These downtubes 507 extend downwardly and then rearwardly and also connected to a lower portion 508 of the bracket 506 as by welding.

The frame further includes a seat rail 509 that extends rearwardly from the main frame members 505 and which carries a seat 511. The seat 511 is further supported by rear seat stays 512 that extend upwardly and rearwardly from the bracket 506 for connection to the seat rail 509.

A fuel tank which is indicated by the reference numeral 106, that utilized to identify the fuel tank of the previously described embodiment, is disposed forwardly of the seat 511 and is supported by the main frame members 505 in any known manner.

A front fork 513 is dirigibly supported by the head tube 504 and journals a wheel 514 at its lower end. A front fender 515 may also be carried by the front fork 513. The front fork 513 and front wheel 514 are steered by a handle bar assembly 516 disposed forwardly of the seat 511 and the fuel tank 106.

The bracket assembly 506 provides a pivotal support 517 for a trailing arm assembly 518. A rear wheel 519 is rotatably journaled at the rear end of the trailing arm 518. The rear suspension including the trailing arm 518 is controlled by a linkage and shock absorber assembly which is does not appear in significant detail, but which is indicated by the reference numeral 521.

In accordance with conventional motorcycle practice, the engine 501 is provided with a crankcase transmission assembly 522 that includes a transmission case portion 523. This transmission case portion 523 contains, as is typical with motorcycle practice, a change speed transmission that drives an output sprocket 524 at selected speed ratios. The sprocket 524, in turn, drives a sprocket 525 that is fixed for rotation with the rear wheel 519 through a chain 526.

Before turning further to the internal details of the engine 501, its induction and exhaust system will be described in detail. The induction system is basically the same as the induction system employed in conjunction with the outboard motor 51 of the embodiment of FIGS. 1-17. However, rather than using only an air inlet device that employs a silencer, the engine 501 is provided with an atmospheric air inlet device 527 which is disposed to the rear of the engine 501 and beneath the fuel tank 106. This device 527 includes, in addition to a silencing arrangement, a filter for removing foreign particles from the air. Beyond this, the air inlet device 527 supplies the inducted air to a throttle body 86 and intake manifold 92 that serves intake ports 93 in which reed-type check valves 94 are provided.

Figure 26:
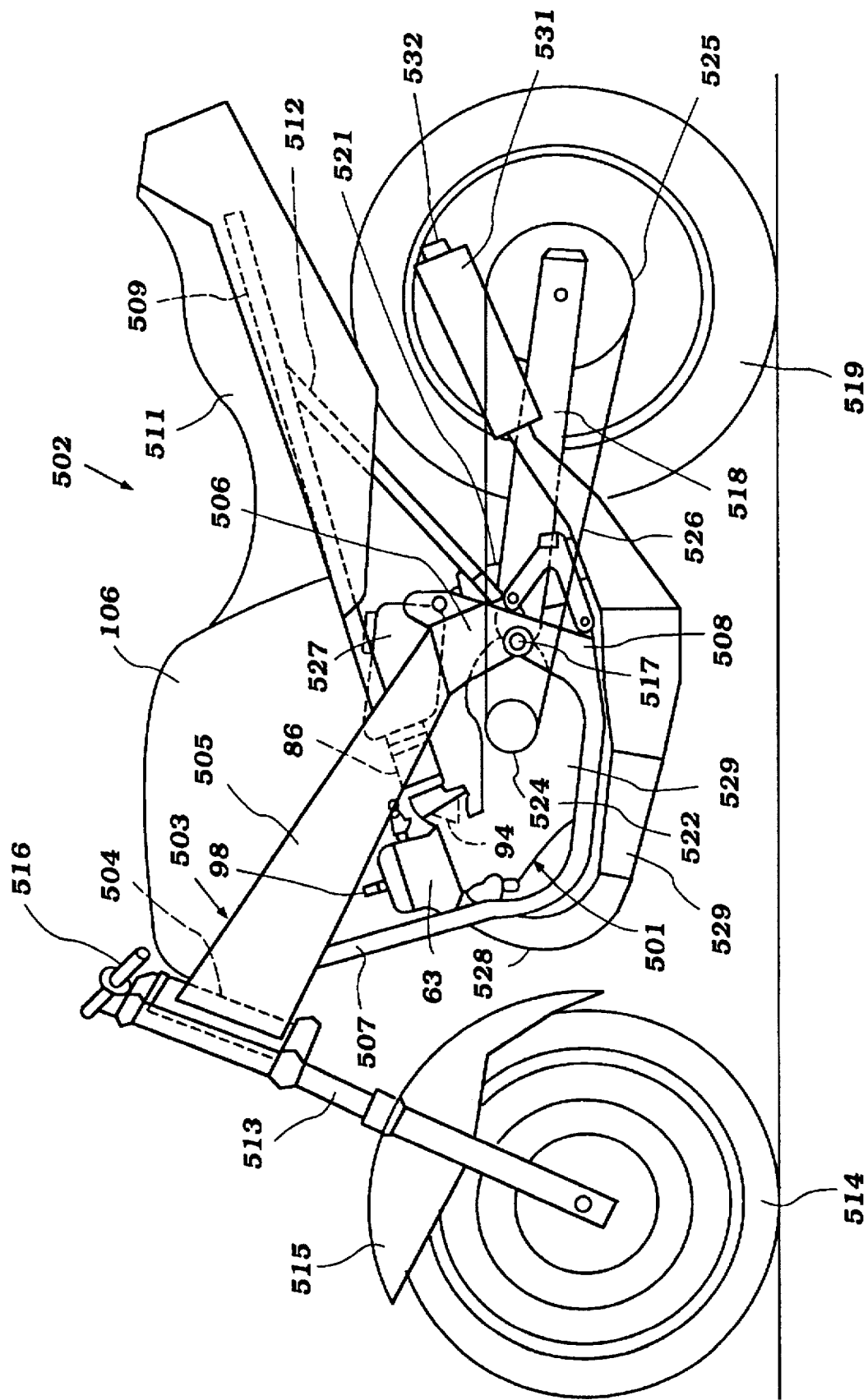
FIG. 26 is a view looking in the same direction as FIG. 25, but taken on a larger scale, showing the engine broken away and in part in section and also shows some of the association components schematically and others in phantom.

As may be seen in FIG. 26, the internal components of the engine are as previously described and where that is the case, they have been identified by the same reference numerals as utilized in conjunction with the description of the engine 501. Additional components, to be described later, are also employed and these will also be described later by reference to FIG. 26.

The exhaust system for the engine 501 is also different from that utilized with an outboard motor, the embodiments previously described. The exhaust system is basically conventional and therefore will be described only generally. It includes an exhaust manifold 528 which collects the exhaust gases from the cylinder block exhaust ports 122, but which formed externally of the cylinder block 63 unlike the outboard motor application. The exhaust gases are delivered from the exhaust manifold 528 to an expansion chamber device 529 and which may include a catalytic convertor including a three-way catalyst. The exhaust gases are then transferred to a muffler 531 which has a tailpipe 532 of relatively short length for discharge of the exhaust gases to the atmosphere.

From the foregoing description is should be readily apparent that the earlier description of the application for the engine is of a type that may be well known in the art. For the same reasons as previously described, therefore, further details of the construction of the motorcycle and engine 501, except in so far as they relate to the construction and operation of the invention, will be left to those skilled in the art who should have no difficulty in practicing the invention from this description.

Referring now in detail to FIG. 26, the internal components of the engine 501 will be described, but only in so far as they differ from those of the previously described embodiments. Basically although the layout may be different, the components are the same and where that is the case they have been identified by the same reference numerals and will not be described again.

In conjunction with this application, however, each of the exhaust ports 122 is provided with an exhaust control valve, indicated generally by the reference numeral 533 which is disposed in conjunction with the exhaust ports 122 and is configured and operated by a servo-motor 534 in such a way as to change the effective compression ratio of the engine 501. This is done by changing the exhaust port opening and closing timing in a manner as is well known in this art. This feature may be utilized in conjunction with the fuel injection strategy since because the exhaust port timing is changed, the injection timing can be changed to take advantage of the changed exhaust port timing.

As has been described in conjunction to reference to FIG. 12, the injection end limit is set primarily by the point at which the fuel injector 104 is masked by the movement of the pistons 72. However, the timing of closing of the exhaust port is also significant in controlling the timing of fuel injection. Therefore, if the timing of closing of the exhaust port is advanced, the timing of the end of fuel injection can also be advanced.

In addition to the exhaust timing control valve 533, there may be provided in the exhaust manifold 528 or in some other component of the exhaust discharge system, an exhaust control valve 535. The exhaust control valve 535 is opened and closed so as to control pressure pulses feedback to the engine through the exhaust system. Again, this type of device is known in the art. The exhaust control valve 535 is controlled by a servo-motor 536 in conjunction with any desired strategy.

The drawings also show the manner in which the throttle valves 87 are controlled in more detail than the previously embodiment. Like the previous embodiment, the throttle valves 87 are fixed to a throttle valve shaft, indicated by the reference numeral 537, which is journaled in the throttle body 86 in a known manner. However, a twist grip throttle control 538 is mounted on one of the handlebars 516 and is connected to a pulley 539 affixed to one end of the throttle valve shaft 537 by means of a wire actuator 541.

Rather than employing a throttle position sensor such as the sensor 182 in the previous embodiment, a throttle actuator sensor 542 may be employed in this embodiment to supply a control signal to the ECU, which is indicated in this embodiment by the reference numeral 543. A different reference numeral is utilized for the designation of the ECU in this embodiment merely because it controls additional functions such as the operation of the exhaust control servo-motor 534, the exhaust control valve servo-motor 536, as well as the firing of the spark plugs 98 by an ignition system shown schematically in this figure and indicated by the reference numeral 543.

Figure 27:
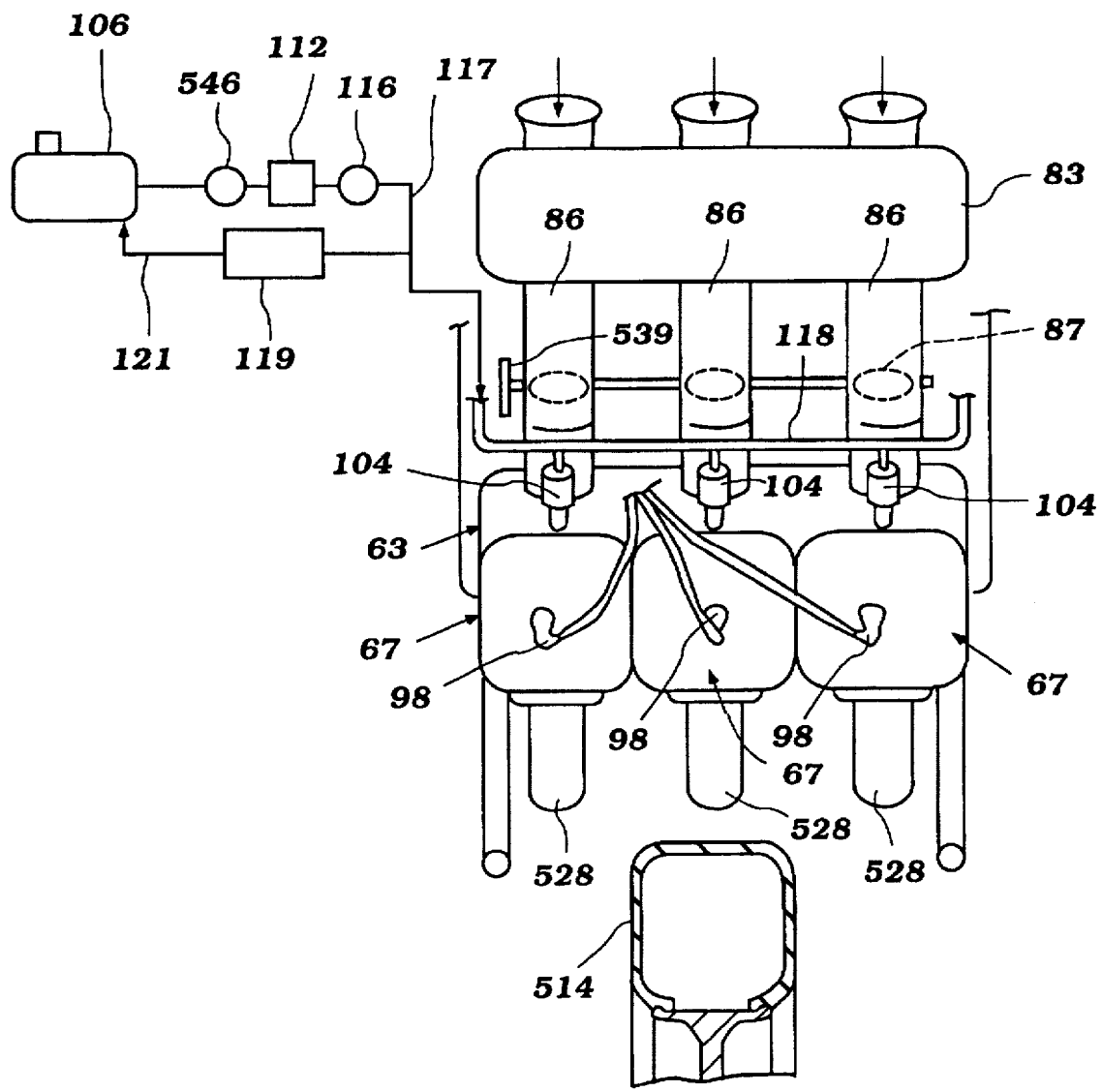
FIG. 27 is a view of the engine looking generally in the direction of the arrow 27 in FIG. 26.
Figure 28:
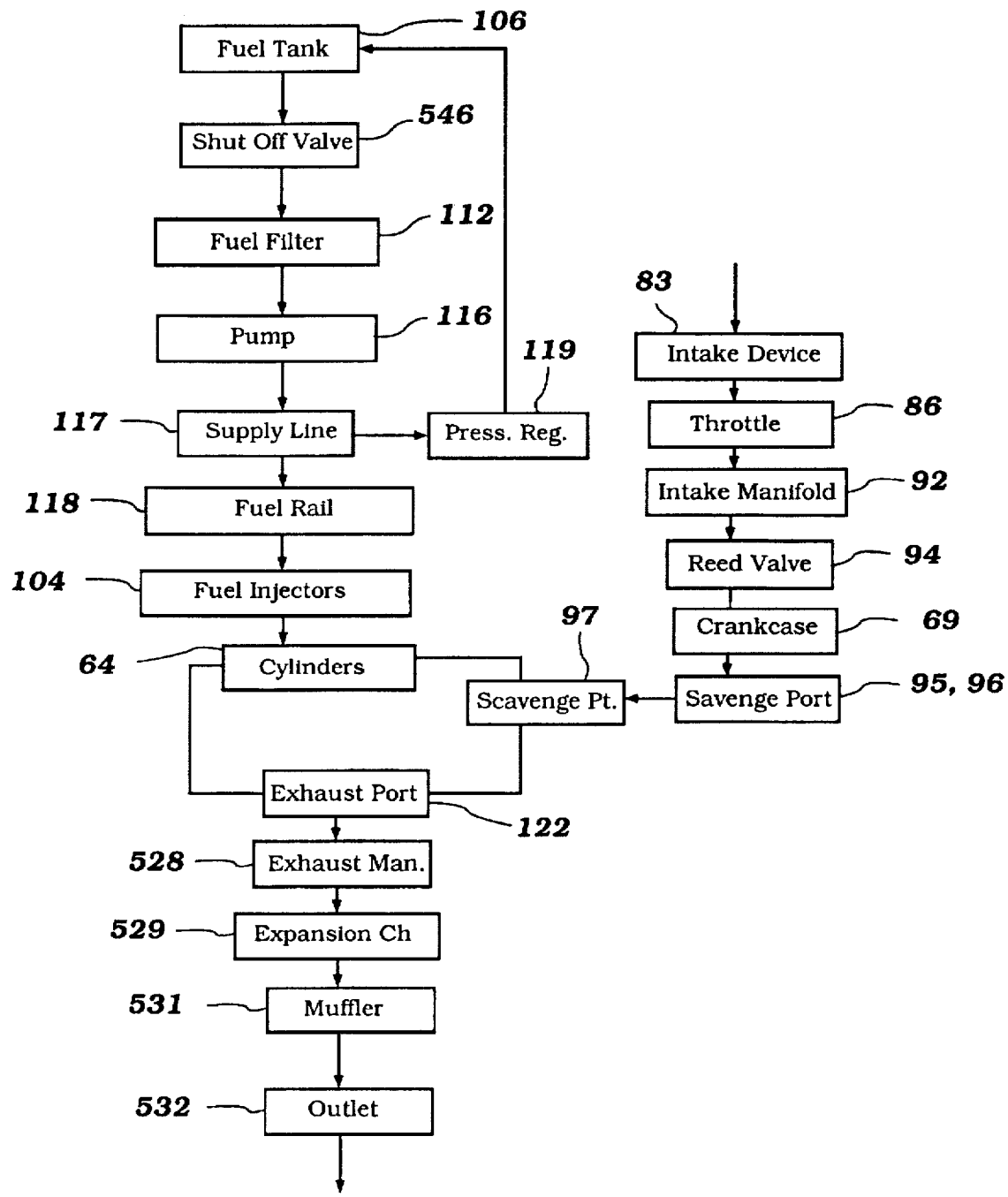
FIG. 28 is a schematic view showing the components of fuel injection and induction system of this embodiment.

As may be seen in FIGS. 27 and 28, the fuel supply system for supplying fuel to the fuel injectors 104 differs in two regards from the outboard motor system. In this embodiment, there is no vapor separator. However, there is a main fuel shut-off valve, indicated by the reference numeral 546, which is interposed between the fuel tank 106 and a fuel filter 112. From the fuel filter, fuel is supplied to the high pressure pump 116 and then through the supply conduit 117 to the fuel rail 118. In this environment, the fuel rail runs transversely along the upper side of the engine between the cylinder block 63 and the engine induction system.

The ECU 543 has a CPU 544 that receives the various input signals as with the previously described embodiment plus some additional input signals, as will now be described. These input signals are then utilized to control the engine and specifically the ignition system 544 and the other components already described.

In this embodiment, there are certain additional sensors and these include an actual crankcase speed sensor 547 which is provided in addition to the crank angle sensor 185. There is also provided in the exhaust manifold 538, an exhaust temperature sensor 548. This temperature sensor is utilized in combination with the exhaust control valve 535 so as to tune the exhaust to optimum performance. In all other regards, the construction and operation of this embodiment is the same as that described and for this reason, further description of this embodiment is not believed to be necessary to permit those skilled in the art to practice the invention.

Thus, from the foregoing description, it should be readily apparent that the described embodiments of the invention are very effective in providing in-cylinder fuel injection with a low cost relatively low pressure fuel injector. In addition, the position of the injector to be protected by the piston does not interfere with its ability to spray adequate fuel for all running conditions. The spray pattern is also such that a stratified charge may be formed in the combustion chamber and full combustion of fuel will result under all running conditions. Furthermore the injection, although being directed somewhat generally toward the exhaust port is timed and oriented so that no fresh fuel will pass directly out the exhaust port under any running condition. Of course, the foregoing description is that of preferred embodiments of the invention and various changes and modifications may be made without departing from the spirit and scope of the invention, as defined by the appended claims.

What is claimed is:

1. A direct cylinder injected, two cycle internal combustion engine comprised of a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and cylinder head a variable volume combustion chamber, an exhaust port opening into said combustion chamber and opened and closed by said piston during its stroke, a fuel injector supported within said cylinder block and having a nozzle having a spray axis extending transversely into said cylinder bore, and means for precluding the fuel sprayed from said fuel injector from passing out of said exhaust port comprising means for limiting the pressure in said fuel injector upstream of its injector port to the range of 300 to 1000 kilopascal.

2. A direct cylinder injected, two cycle internal combustion engine as set forth in claim 1 wherein the means for precluding the fuel sprayed from the fuel injector from passing out of the exhaust port also comprises means for limiting the spray velocity to the range of 10 to 30 meters per second.

3. A direct cylinder injected, two cycle internal combustion engine as set forth in claim 2 wherein the spray velocity is limited to 20 meters per second.

4. A direct cylinder injected, two cycle internal combustion engine comprised of a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and cylinder head a variable volume combustion chamber, an exhaust port opening into said combustion chamber and opened and closed by said piston during its stroke, a fuel injector supported within said cylinder block and having a nozzle having a spray axis extending transversely into said cylinder bore, and means for precluding the fuel sprayed from said fuel injector from passing out of said exhaust port comprising control means for initiating fuel injection at substantially all running conditions after the said exhaust port is opened and for terminating fuel injection after said exhaust port is closed under only high load conditions.

5. A direct cylinder injected, two cycle internal combustion engine as set forth in claim 4 wherein the control means effects advancing of the initiation of fuel injection as engine speed is increased.

6. A direct cylinder injected, two cycle internal combustion engine as set forth in claim 5 wherein the initiation of fuel injection is not changed substantially with changes in load regardless of the engine speed.

7. A direct cylinder injected, two cycle internal combustion engine as set forth in claim 4 wherein the injector axis is disposed closer to the end of the cylinder bore closed by the cylinder head than the upper edge of the exhaust port.

8. A direct cylinder injected, two cycle internal combustion engine as set forth in claim 7 wherein the injector axis is disposed so as to be covered by the piston during a portion of its travel.

9. A direct cylinder injected, two cycle internal combustion engine as set forth in claim 8 wherein the means for precluding the fuel sprayed from the fuel injector from passing out of the exhaust port also comprises means for limiting the spray velocity to the range of 10 to 30 meters per second.

10. A direct cylinder injected, two cycle internal combustion engine as set forth in claim 9 wherein the spray velocity is limited to 20 meters per second.

11. A direct cylinder injected, two cycle internal combustion engine as set forth in claim 8 wherein the means for precluding the fuel sprayed from the fuel injector from passing out of the exhaust port also comprises means for limiting the pressure in the fuel injector upstream of its injector port to the range of 300 to 1000 kilopascal.

12. A direct cylinder injected, two cycle internal combustion engine as set forth in claim 11 wherein the means for precluding the fuel sprayed from the fuel injector from passing out of the exhaust port also comprises means for limiting the spray velocity to the range of 10 to 30 meters per second.

13. A direct cylinder injected, two cycle internal combustion engine as set forth in claim 12 wherein the spray velocity is limited to 20 meters per second.

14. A method of operating a direct cylinder injected, two cycle internal combustion engine comprised of a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and cylinder head a variable volume combustion chamber, an exhaust port opening into said combustion chamber and opened and closed by said piston during its stroke, and a fuel injector supported within said cylinder block and having a nozzle having a spray axis extending transversely into said cylinder bore, said method comprising the step of precluding the fuel sprayed from said fuel injector from passing out of said exhaust port by limiting the pressure in the fuel injector upstream of its injector port to the range of 300 to 1000 kilopascal.

15. A method of operating a direct cylinder injected, two cycle internal combustion engine as set forth in claim 14 wherein the preclusion of the fuel sprayed from the fuel injector from passing out of the exhaust port comprises is also done by limiting the spray velocity to the range of 10 to 30 meters per second.

16. A method of operating a direct cylinder injected, two cycle internal combustion engine as set forth in claim 15 wherein the spray velocity is limited to 20 meters per second.

17. A method of operating a direct cylinder injected, two cycle internal combustion engine comprised of a cylinder block having a cylinder bore extending from an upper peripheral edge closed by a cylinder head, a piston reciprocating in said cylinder bore between a bottom dead center (BDC) position and a top dead center (TDC) position and forming with said cylinder bore and cylinder head a variable volume combustion chamber, an exhaust port opening into said combustion chamber and opened and closed by said piston during its stroke, and a fuel injector supported within said cylinder block and having a nozzle having a spray axis extending transversely into said cylinder bore, said method comprising the step of precluding the fuel sprayed from said fuel injector from passing out of said exhaust port by initiating fuel injection at substantially all running conditions after the said exhaust port is opened and terminating fuel injection after said exhaust port is closed under only high load conditions.

18. A method of operating a direct cylinder injected, two cycle internal combustion engine as set forth in claim 17 wherein the initiation of fuel injection is advanced as engine speed is increased.

19. A method of operating a direct cylinder injected, two cycle internal combustion engine as set forth in claim 18 wherein the initiation of fuel injection is not changed substantially with changes in load regardless of the engine speed.

20. A method of operating a direct cylinder injected, two cycle internal combustion engine as set forth in claim 17 wherein the injector axis is disposed closer to the end of the cylinder bore closed by the cylinder head than the upper edge of the exhaust port.

21. A method of operating a direct cylinder injected, two cycle internal combustion engine as set forth in claim 20 wherein the injector axis is disposed so as to be covered by the piston during a portion of its travel.

22. A method of operating a direct cylinder injected, two cycle internal combustion engine as set forth in claim 21 wherein the preclusion of the fuel sprayed from the fuel injector from passing out of the exhaust port also is done by limiting the spray velocity to the range of 10 to 30 meters per second.

23. A method of operating a direct cylinder injected, two cycle internal combustion engine as set forth in claim 22 wherein the spray velocity is limited to 20 meters per second.

24. A method of operating a direct cylinder injected, two cycle internal combustion engine as set forth in claim 21 wherein the preclusion of the fuel sprayed from the fuel injector from passing out of the exhaust port also is done by limiting the pressure in the fuel injector upstream of its injector port to the range of 300 to 1000 kilopascal.

25. A method of operating a direct cylinder injected, two cycle internal combustion engine as set forth in claim 24 wherein the preclusion of the fuel sprayed from the fuel injector from passing out of the exhaust port also is done by limiting the spray velocity to the range of 10 to 30 meters per second.

26. A method of operating a direct cylinder injected, two cycle internal combustion engine as set forth in claim 25 wherein the spray velocity is limited to 20 meters per second.

* * * * *